(12) United States Patent
Motohira

(10) Patent No.: US 12,427,880 B2
(45) Date of Patent: Sep. 30, 2025

(54) VEHICLE AND CHARGING SYSTEM

(71) Applicant: TOYOTA JIDOSHA KABUSHIKI KAISHA, Toyota (JP)

(72) Inventor: Akito Motohira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 750 days.

(21) Appl. No.: 17/748,239

(22) Filed: May 19, 2022

(65) Prior Publication Data

US 2022/0371467 A1    Nov. 24, 2022

(30) Foreign Application Priority Data

May 24, 2021    (JP) ................................. 2021-087148

(51) Int. Cl.

| | |
|---|---|
| *B60L 53/62* | (2019.01) |
| *B60L 53/10* | (2019.01) |
| *B60L 53/30* | (2019.01) |
| *B60L 58/12* | (2019.01) |
| *H02J 7/00* | (2006.01) |
| *B60L 58/13* | (2019.01) |

(52) U.S. Cl.
CPC ............... *B60L 53/62* (2019.02); *B60L 53/11* (2019.02); *B60L 53/305* (2019.02); *B60L 58/12* (2019.02); *H02J 7/00034* (2020.01); *H02J 7/0048* (2020.01); *H02J 7/00714* (2020.01); *H02J 7/007182* (2020.01); *B60L 58/13* (2019.02); *Y02T 90/16* (2013.01)

(58) Field of Classification Search
CPC ........ B60L 53/62; B60L 53/11; B60L 53/305; H02J 7/007182; H02J 7/00714

USPC ......................................................... 320/109
See application file for complete search history.

(56) References Cited

U.S. PATENT DOCUMENTS

| | | | | |
|---|---|---|---|---|
| 2010/0301810 | A1* | 12/2010 | Biondo .................. | B60L 53/66 |
| | | | | 320/155 |
| 2011/0101915 | A1* | 5/2011 | Mitsutani .............. | B60L 53/305 |
| | | | | 320/109 |
| 2013/0214738 | A1* | 8/2013 | Chen ...................... | B60L 58/13 |
| | | | | 320/109 |

(Continued)

FOREIGN PATENT DOCUMENTS

JP    2020-124033    8/2020

*Primary Examiner* — Julian D Huffman
*Assistant Examiner* — Lisa Kotowski
(74) *Attorney, Agent, or Firm* — Sughrue Mion, PLLC

(57) ABSTRACT

A processor of a vehicle stops charging when an actually measured charging ratio is equal to or higher than a target charging ratio in a charging phase. While the target charging ratio is higher than a charging threshold value, when the actually measured charging ratio is equal to or lower than the charging threshold value, the processor transmits to a charging apparatus, the actually measured charging ratio as a transmission charging ratio, when the actually measured charging ratio is higher than the charging threshold value and lower than the target charging ratio, the processor transmits to the charging apparatus, a value equal to or smaller than the charging threshold value as the transmission charging ratio, and when the actually measured charging ratio is equal to or higher than the target charging ratio, the processor transmits to the charging apparatus, the actually measured charging ratio as the transmission charging ratio.

11 Claims, 22 Drawing Sheets

(56) References Cited

U.S. PATENT DOCUMENTS

| | | | | |
|---|---|---|---|---|
| 2014/0163803 A1* | 6/2014 | Kamatani | ............ | B60W 10/06 |
| | | | | 903/903 |
| 2015/0032315 A1* | 1/2015 | Kinomura | ............ | B60L 3/0069 |
| | | | | 701/22 |
| 2018/0154791 A1* | 6/2018 | Homma | ................ | B60L 55/00 |

* cited by examiner

FIG.2

DATABASE DB1

| CHARGING APPARATUS ID | POSITION INFORMATION | THRESHOLD VALUE TH1 |
|---|---|---|
| CHARGING APPARATUS ID | POSITION INFORMATION | THRESHOLD VALUE TH1 |
| CHARGING APPARATUS ID | POSITION INFORMATION | THRESHOLD VALUE TH1 |
| CHARGING APPARATUS ID | POSITION INFORMATION | THRESHOLD VALUE TH1 |
| CHARGING APPARATUS ID | POSITION INFORMATION | THRESHOLD VALUE TH1 |

FIG.11

DATABASE DB2

| CHARGING APPARATUS ID | POSITION INFORMATION | PRESCRIBED VALUE TH |
|---|---|---|
| CHARGING APPARATUS ID | POSITION INFORMATION | PRESCRIBED VALUE TH |
| CHARGING APPARATUS ID | POSITION INFORMATION | PRESCRIBED VALUE TH |
| CHARGING APPARATUS ID | POSITION INFORMATION | PRESCRIBED VALUE TH |
| CHARGING APPARATUS ID | POSITION INFORMATION | PRESCRIBED VALUE TH |

VEHICLE AND CHARGING SYSTEM

This nonprovisional application is based on Japanese Patent Application No. 2021-087148 filed with the Japan Patent Office on May 24, 2021, the entire contents of which are hereby incorporated by reference.

BACKGROUND

Field

The present disclosure relates to a vehicle and a charging system.

Description of the Background Art

Various charging systems each including a vehicle including a power storage and a charging apparatus that charges the power storage have been proposed.

For example, in a charging system described in Japanese Patent Laying-Open No. 2020-124033, a vehicle transmits a command value of a charging current to a charging apparatus and the charging apparatus adjusts the charging current based on the received command value.

SUMMARY

Various power storage manufacturers provide power storages mounted on vehicles. Therefore, quality of the power storages mounted on the vehicles may be varied.

When the quality is varied, some power storages may be damaged when they are charged to a high SOC. In order to suppress damage to the power storages, the charging apparatus may be set to stop charging when the SOC attains to a prescribed value.

Consequently, for example, even when a user plans charging up to full charge as a target SOC or plans charging up to a planned target SOC, charging may be stopped before the power storage is fully charged or before the target SOC is attained.

The present disclosure was made in view of problems as above, and an object thereof is to provide a vehicle and a charging system that allow charging up to a high SOC in charging of a power storage with such a charging apparatus as stopping charging when an SOC attains to a prescribed value.

A vehicle according to the present disclosure is a vehicle in which a mounted power storage is charged by receiving electric power from an externally provided charging apparatus, and the charging apparatus stops charging to the vehicle when a first charging ratio transmitted from the vehicle becomes higher than a prescribed value. The vehicle includes the power storage, a processor that calculates a second charging ratio representing a charging ratio of the power storage, and a communication unit that transmits the first charging ratio to the charging apparatus. In a charging phase, the processor stops charging when the second charging ratio becomes equal to or higher than a prescribed third charging ratio. While the third charging ratio is higher than a charging threshold value associated with the prescribed value, when the second charging ratio is equal to or lower than the charging threshold value, the processor transmits to the charging apparatus, the second charging ratio as the first charging ratio, when the second charging ratio is higher than the charging threshold value and lower than the third charging ratio, the processor transmits to the charging apparatus, a value equal to or smaller than the charging threshold value as the first charging ratio, and when the second charging ratio is equal to or higher than the third charging ratio, the processor transmits to the charging apparatus, the second charging ratio as the first charging ratio.

According to the vehicle, even when the power storage is charged with the use of such a charging apparatus as stopping charging when the SOC attains to a prescribed value, the power storage can be charged to a high SOC.

A charging system according to the present disclosure includes a power storage vehicle and a charging apparatus. When a first charging ratio transmitted from the vehicle becomes higher than a prescribed value, the charging apparatus stops charging to the vehicle. The vehicle includes a power storage, a processor that calculates a second charging ratio representing a charging ratio of the power storage, and a communication unit that transmits the first charging ratio to the charging apparatus. In a charging phase, the processor stops charging when the second charging ratio becomes equal to or higher than a third charging ratio. While the third charging ratio is higher than a charging threshold value associated with the prescribed value, when the second charging ratio is equal to or lower than the charging threshold value, the processor transmits to the charging apparatus, the second charging ratio as the first charging ratio, when the second charging ratio is higher than the charging threshold value and lower than the third charging ratio, the processor transmits to the charging apparatus, a value equal to or smaller than the charging threshold value as the first charging ratio, and when the second charging ratio is equal to or higher than the third charging ratio, the processor transmits to the charging apparatus, the second charging ratio as the first charging ratio.

According to the charging system, even when the power storage is charged with the use of such a charging apparatus as stopping charging when the SOC attains to a prescribed value, the power storage can be charged to a high SOC.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a schematic diagram schematically showing a database DB1 where a charging threshold value TH1 of a charging apparatus is stored, the database being stored in a server 4.

FIG. 11 is a flowchart showing a flow in the battery charge parameter configuration phase of charging system 1A.

DESCRIPTION OF THE PREFERRED EMBODIMENTS

A charging system 1 according to the present embodiment will be described with reference to FIGS. 1 to 22. The charging system according to the present embodiment will be described with reference to FIGS. 1 to 22.

First Embodiment

Figure 1:
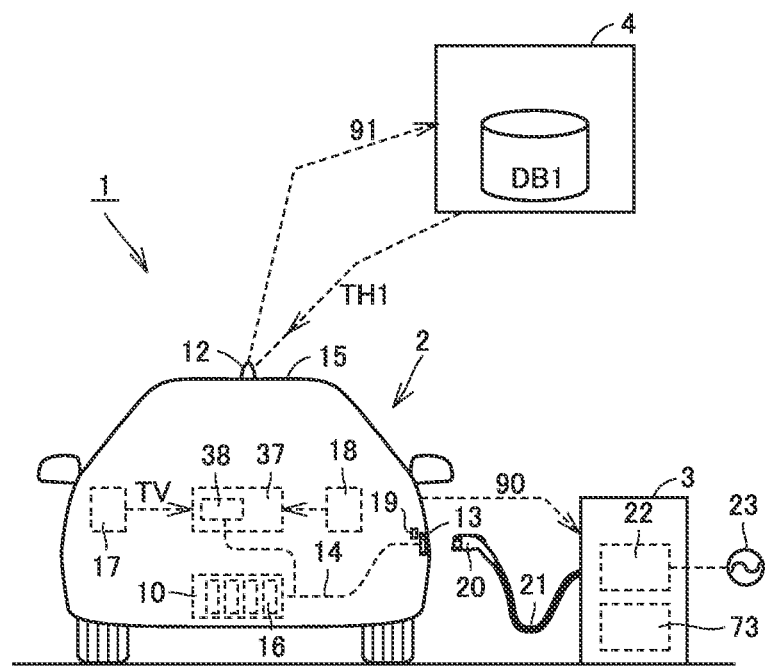
FIG. 1 is a schematic diagram schematically showing a charging system 1 according to the present first embodiment.

FIG. 1 is a schematic diagram schematically showing charging system 1 according to the present first embodiment. Charging system 1 includes a vehicle 2, a charging apparatus 3, and a server 4.

Vehicle 2 includes a power storage 10, a vehicle controller 37, an external communication unit 12, a charge inlet 13, an electrical wire 14, a vehicle main body 15, an input unit 17, a position detector 18, and an electronic lock 19.

Power storage 10, vehicle controller 37, input unit 17, position detector 18, and electrical wire 14 are provided within vehicle main body 15.

Power storage 10 is, for example, a secondary battery such as a lithium ion battery. Power storage 10 includes a plurality of unit cells 16. Power storage 10 supplies electric power to a not-shown rotating electric machine to drive the rotating electric machine.

Charge inlet 13 is provided in a side surface of vehicle main body 15. Charge inlet 13 is configured such that a plug 20 provided in charging apparatus 3 can be connected thereto. Electronic lock 19 is an apparatus for locking plug 20 connected to charge inlet 13.

Electrical wire 14 connects charge inlet 13 and power storage 10 to each other. Electrical wire 14 includes a power line and a communication line. The power line of electrical wire 14 connects charge inlet 13 and power storage 10 to each other. Electric power supplied from charge inlet 13 is supplied through electrical wire 14 to power storage 10. The communication line of electrical wire 14 is connected to charge inlet 13, vehicle controller 37, and a BMS 38.

External communication unit 12 is provided on an upper surface of vehicle main body 15. External communication unit 12 is configured to communicate with server 4, so that vehicle 2 transmits and receives various types of information to and from server 4.

A user enters various types of information into input unit 17. For example, in charging of power storage 10, the user can enter a target SOC value (third charging ratio) TV. Target SOC value TV entered into input unit 17 is stored in vehicle controller 37. The "SOC value" herein means a "charging ratio." The SOC means a "state of charge" of power storage 10.

Position detector 18 is an apparatus that obtains a position of vehicle 2. For example, a global positioning system (GPS) or the like can be adopted as position detector 18. Current position information of vehicle 2 obtained by position detector 18 is stored in vehicle controller 37.

Vehicle controller 37 includes a battery management system (BMS) 38. BMS 38 transmits and receives various types of information by communicating with a charger controller 73 during charging.

Charging apparatus 3 includes plug 20, a charging cord 21, a charger 22, and charger controller 73. Plug 20 is configured to be connectable to charge inlet 13.

Charger 22 is connected to an external power supply 23 provided outside. Charger 22 converts alternating-current (AC) power supplied from external power supply 23 into direct-current (DC) power.

Charging cord 21 is connected to charger 22 and plug 20 is connected at a tip end of charging cord 21. Charging cord 21 includes a power line and a communication line. The power line of charging cord 21 connects plug 20 and charger 22 to each other and the communication line of charging cord 21 connects plug 20 and charger controller 73 to each other.

DC power provided from charger 22 is supplied to power storage 10 through the power line of charging cord 21, plug 20, charge inlet 13, and the power line of electrical wire 14.

Charger controller 73 and BMS 38 (vehicle controller 37) transmit and receive various types of information to and from each other through the communication line of charging cord 21, plug 20, charge inlet 13, and the communication line of electrical wire 14.

During charging of power storage 10 by charging apparatus 3, charger controller 73 receives a transmission SOC value (first charging ratio) 90 from BMS 38 through charging cord 21. Transmission SOC value 90 is a value transmitted from vehicle 2 as a value indicating a current SOC of power storage 10, however, it is different from an SOC value as an actually measured value as will be described later.

Then, charger controller 73 stops charging when transmission SOC value 90 attains to a prescribed value TH. Prescribed value TH is set, for example, to 85% to 95%.

By setting prescribed value TH within such a range, for example, even when power storage 10 is a power storage that is likely to be damaged at a high SOC, damage to power storage 10 can be suppressed.

Vehicle 2 transmits a completion SOC value 91 to server 4 at the time of completion of charging. Completion SOC value 91 is an SOC obtained by actually measuring the SOC of power storage 10 at the time of completion of charging.

Server 4 receives completion SOC value 91 at the time of completion of charging from a plurality of vehicles charged by charging apparatus 3. Then, server 4 predicts prescribed value TH of charging apparatus 3 based on a plurality of completion SOC values and calculates a charging threshold value TH1. Calculated charging threshold value TH1 is stored in a storage of server 4.

Before a charging phase, vehicle 2 transmits a request signal that requests server 4 to give charging threshold value TH1 and server 4 transmits charging threshold value TH1 of charging apparatus 3 to vehicle 2. Vehicle 2 receives charging threshold value TH1 through external communication unit 12 and received charging threshold value TH1 is stored in a storage of BMS 38.

FIG. 2 is a schematic diagram schematically showing a database DB1 where charging threshold value TH1 of the charging apparatus is stored, database DB1 being stored in server 4.

An ID for identifying each charging apparatus, position information of the charging apparatus, and charging threshold value TH1 are stored in database DB1.

Figure 3:
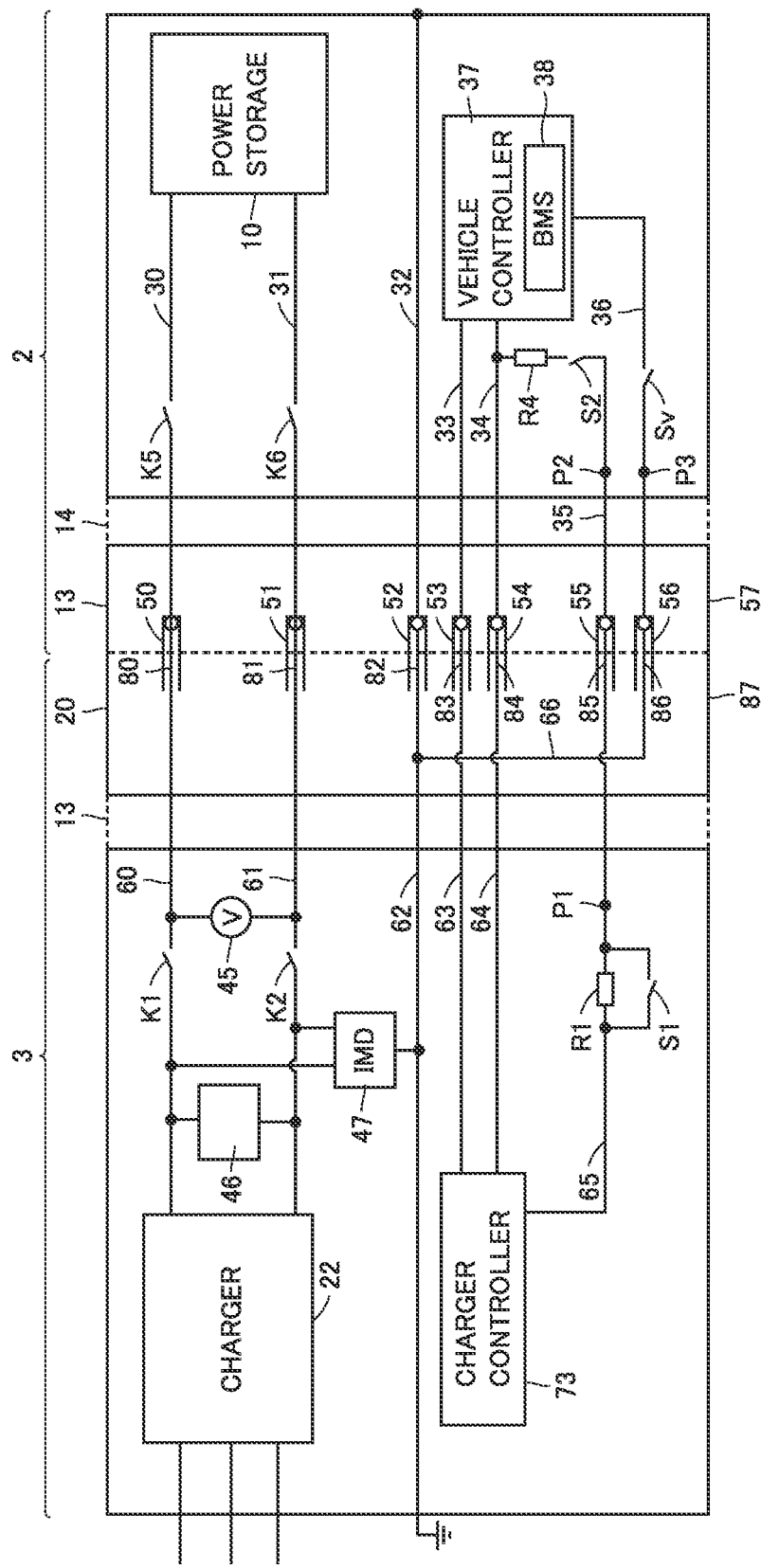
FIG. 3 is a block diagram in a state that a plug 20 is connected to a charge inlet 13 of a vehicle 2.

FIG. 3 is a block diagram in a state that plug 20 is connected to charge inlet 13 of vehicle 2.

Charge inlet 13 includes a DC (+) terminal 50, a DC (−) terminal 51, a PE terminal 52, an S (+) terminal 53, an S (−) terminal 54, a CC1 terminal 55, a CC2 terminal 56, and a housing 57. Terminals 50 to 56 are accommodated in housing 57 and insulated.

Vehicle 2 includes power storage 10, vehicle controller 37, a DC (+) wire 30, a DC (−) wire 31, a PE line 32, an S (+) signal line 33, an S (−) signal line 34, a CC1 communication line 35, a CC1 communication line 36, vehicle controller 37, contactors K5 and K6, and switches S2 and Sv.

DC (+) wire 30 and DC (−) wire 31 are connected to power storage 10. DC (+) wire 30 is connected to DC (+) terminal 50 and DC (−) wire 31 is connected to DC (−) terminal 51. PE line 32 is a grounding line and connected to PE terminal 52.

S (+) signal line 33, S (−) signal line 34, CC1 communication line 35, and CC1 communication line 36 are connected to vehicle controller 37. S (+) signal line 33 is connected to S (+) terminal 53 and S (−) signal line 34 is connected to S (−) terminal 54. CC1 communication line 35 is connected to CC1 terminal 55 and CC1 communication line 36 is connected to CC2 terminal 56.

Contactor K5 is provided in DC (+) wire 30 and contactor K6 is provided in DC (−) wire 31. A resistor R4 is connected to CC1 communication line 35 and switch S2 is connected to CC1 communication line 35 in series to resistor R4. Switch Sv is provided in CC1 communication line 36. Vehicle controller 37 controls switching ON/OFF of contactors K5 and K6 and switches S2 and Sv.

Vehicle controller 37 is provided with battery management system (BMS) 38.

Charging apparatus 3 includes charger 22, a DC (+) wire 60, a DC (−) wire 61, a PE line 62, an S (+) signal line 63, an S (−) signal line 64, a CC1 communication line 65, a CC2 communication line 66, a contactor K1, a contactor K2, a switch S1, a voltage measurement apparatus 45, a bleeder circuit 46, an insulating monitoring device (IMD) 47, and charger controller 73.

Plug 20 includes a DC (+) terminal 80, a DC (−) terminal 81, a PE terminal 82, an S (+) terminal 83, an S (−) terminal 84, a CC1 terminal 85, a CC2 terminal 86, and a housing 87. The terminals are accommodated in housing 87.

DC (+) wire 60 and DC (−) wire 61 are connected to charger 22. DC (+) wire 60 is connected to DC (+) terminal 80 and DC (−) wire 61 is connected to DC (−) terminal 81. PE line 62 is a grounding line and connected to PE terminal 82.

S (+) signal line 63, S (−) signal line 64, and CC1 communication line 65 are connected to charger controller 73. S (+) signal line 63 is connected to S (+) terminal 83 and S (−) signal line 64 is connected to S (−) terminal 84.

CC1 communication line 65 is connected to CC1 terminal 85. CC2 communication line 66 has one end connected to PE line 62 and the other end connected to CC2 terminal 86.

Contactor K1 is provided in DC (+) terminal 80 and contactor K2 is provided in DC (−) terminal 81. CC1 communication line 65 is provided with a resistor R1 and switch S1 is connected to CC1 communication line 65 in parallel to resistor R1.

Voltage measurement apparatus 45 is provided to connect DC (+) wire 60 and DC (−) wire 61 to each other. Specifically, the voltage measurement apparatus is connected between DC (+) terminal 80 and contactor K1 of DC (+) wire 60 and between DC (−) terminal 81 and contactor K2 of DC (−) wire 61.

IMD 47 is provided to connect DC (+) wire 60 and DC (−) wire 61 to each other between charger 22 and contactors K1 and K2. IMD 47 is further connected also to PE line 62. Bleeder circuit 46 is provided to connect DC (+) wire 60 and DC (−) wire 61 to each other between charger 22 and contactors K1 and K2.

While plug 20 is connected to charge inlet 13, DC (+) terminal 50 and DC (+) terminal 80 are connected to each other and DC (−) terminal 51 and DC (−) terminal 81 are connected to each other. PE terminal 52 is connected to PE terminal 82 and S (+) terminal 53 is connected to S (+) terminal 83. S (−) terminal 54 is connected to S (−) terminal 84 and CC1 terminal 55 is connected to CC1 terminal 85. CC2 terminal 56 is connected to CC2 terminal 86.

Vehicle controller 37 periodically monitors detection points P2 and P3 and charger controller 73 periodically monitors a detection point P1.

Charger controller 73 controls switching ON/OFF of charger 22 and switch S1 and controls switching ON/OFF of contactors K1 and K2.

Vehicle controller 37 controls switching ON/OFF of switch S2 and switch Sv and controls switching ON/OFF of contactors K5 and K6.

As plug 20 is connected to charge inlet 13 as above, various types of control for charging are carried out.

Figure 4:
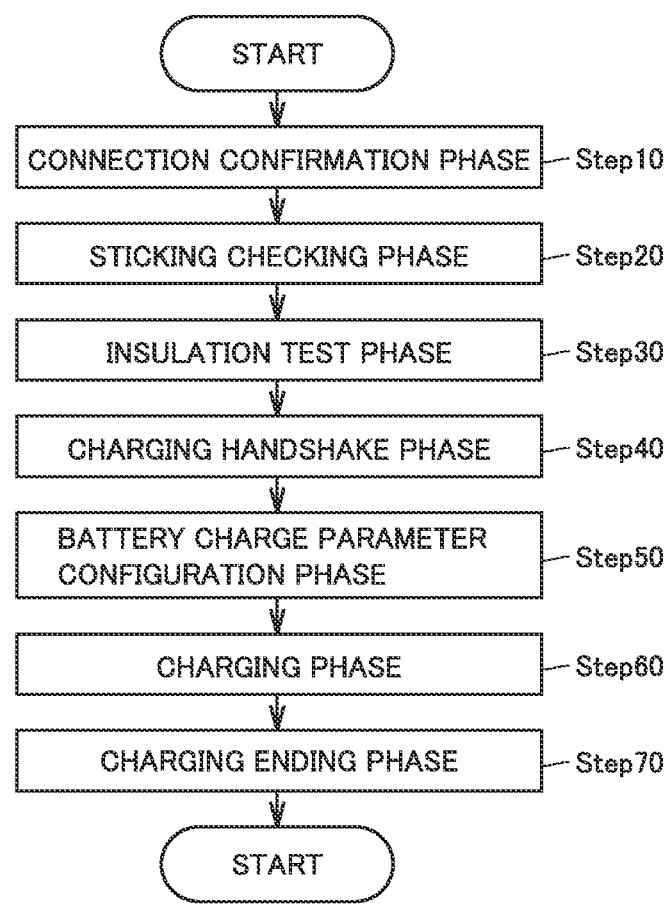
FIG. 4 is a flowchart showing overview of a charging flow.

FIG. 4 is a flowchart showing overview of a charging flow. In FIG. 4, the charging flow includes a connection confirmation phase (Step 10), a sticking checking phase (Step 20), an insulation test phase (Step 30), a charging handshake phase (Step 40), a battery charge parameter configuration phase (Step 50), a charging phase (Step 60), and a charging ending phase (Step 70).

In the connection confirmation phase, whether or not charge inlet 13 and plug 20 are connected to each other is checked.

In FIG. 3, in a non-connected state T0 (a state that charge inlet 13 and plug 20 are not connected to each other), switches S1, S2, and Sv, contactors K1 and K2, and contactors K5 and K6 are open. At this time, a voltage at detection point P1 is, for example, at 12 V. A voltage at detection point P2 is at 0 V.

In a connected state T1 (a state that plug 20 is inserted in charge inlet 13), switches S1, S2, and Sv, contactors K1 and K2, and contactors K5 and K6 are open. Detection point P1 is at 2.95 V, detection point P2 is at 2.25 V, and detection point P3 is at 0 V. In other words, as plug 20 is fitted into charge inlet 13, the voltage at detection point P1 varies from 12 V to 2.95 V and the voltage at detection point P2 varies from 0 V to 2.25 V.

Then, charger controller 73 can sense fitting of plug 20 into charge inlet 13 by sensing variation in voltage at detection point P1. Vehicle controller 37 can sense fitting of plug 20 into charge inlet 13 by sensing variation in voltage at detection point P2.

At wake-up T2 after connected state T1, switch S1 is closed. Then, when the voltage at detection point P1 attains to 8.98 V, charger controller 73 starts transmission of a charging handshake message. Various messages are carried out through S (+) signal line 63 and S (+) signal line 33 as well as S (−) signal line 64 and S (−) signal line 34.

Vehicle controller 37 detects the voltage at detection point P2 being at 8.28 V and confirms connection between CC1 communication line 36 and CC1 communication line 66 to each other. Then, vehicle controller 37 starts transmission and reception of a message to and from charger controller 73.

At wake-up T3 after wake-up T2, charger controller 73 has switch Sv closed. Thereafter, vehicle controller 37 detects the voltage at detection point P3 and determines a version of a connected charging apparatus based on the voltage at detection point P3. For example, when the voltage at detection point P3 is at 6 V, vehicle controller 37 makes determination as connection to a ChaoJi charger.

After vehicle controller 37 determines the version of the charging apparatus connected to charge inlet 13, vehicle controller 37 has switch Sv opened.

At wake-up T4 after wake-up T3, vehicle controller 37 turns ON electronic lock 19 shown in FIG. 1 to lock charge inlet 13 and plug 20. The connection confirmation phase (Step 10) is thus completed.

The sticking checking phase (Step 20) will now be described. In the sticking checking phase, whether or not contactors K5 and K6 are stuck is detected. Specifically, contactor K5 and contactor K6 are in an open (OFF) state, and while charger controller 73 has contactor K1 and contactor K2 set to the open state (OFF), voltage measurement apparatus 45 measures a voltage. Then, when the voltage measured by voltage measurement apparatus 45 does not exceed, for example, 10 V, charger controller 73 determines that contactor K5 and contactor K6 are not stuck.

The insulation test phase (Step 30) will now be described.

Vehicle controller 37 sets contactors K1 and K2 to a closed state (ON). Contactor K5 and contactor K6 are in the open (OFF) state. Then, charger controller 73 has charger 22 provide electric power and conducts an insulation test with the use of IMD 48. For example, the charger controller checks insulation between DC (+) wire 60 and PE line 62 and insulation between DC (−) wire 61 and PE line 62.

Then, when charger controller 73 confirms absence of a problem in each insulated state, it drives bleeder circuit 46 and thereafter sets contactor K1 and contactor K2 to the open (OFF) state. The insulation test phase thus ends.

Referring back to FIG. 4, in the handshake phase (Step 40), BMS 38 and charger controller 73 exchange a version message, discharging compatibility information, and an identification message.

The battery charge parameter configuration phase (Step 50) will now be described. After the charging handshake phase is completed, charger controller 73 and BMS 38 transmit and receive various charging parameter messages and determine whether or not both of them can carry out charging.

Figure 5:
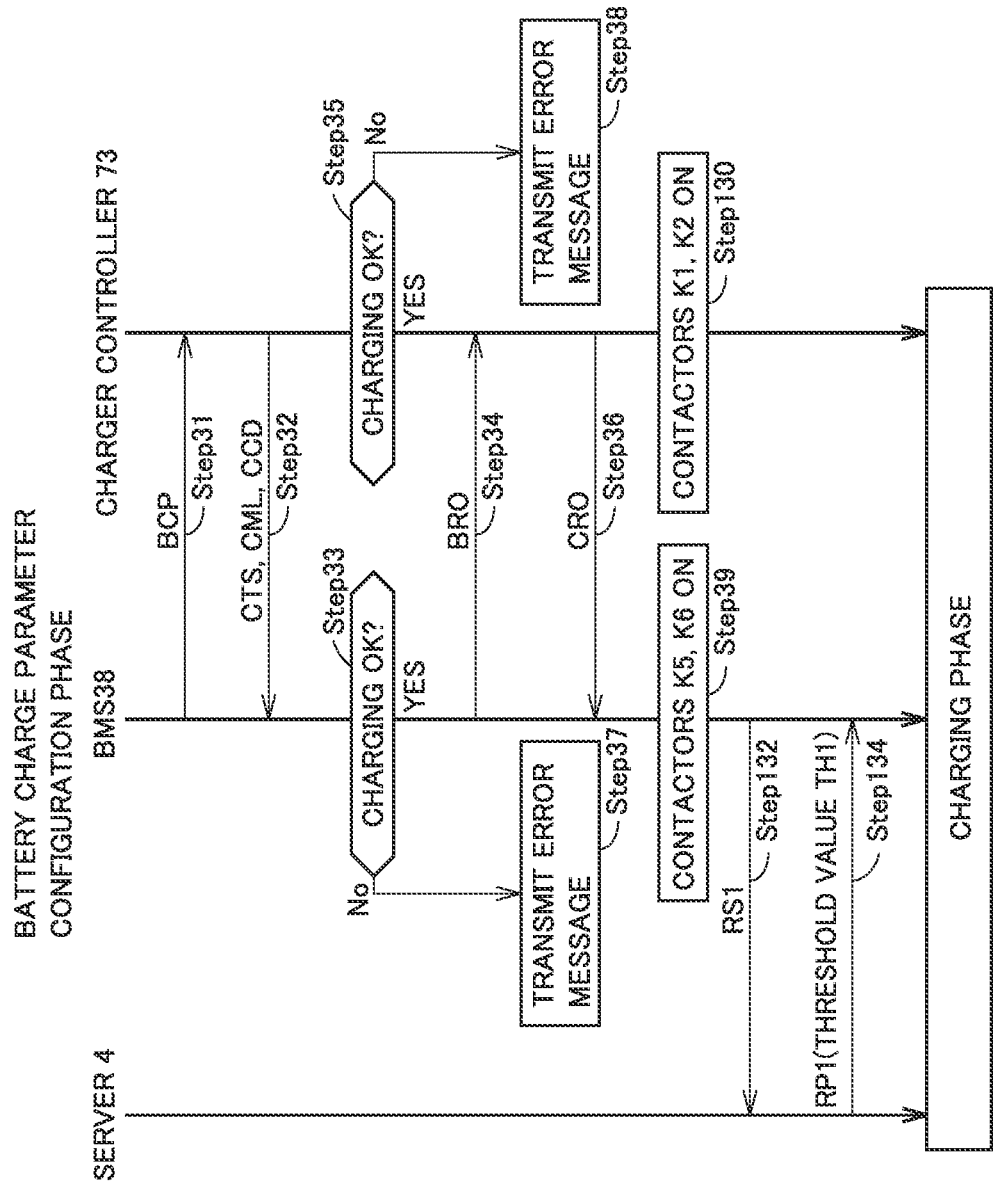
FIG. 5 is a flowchart showing a battery charge parameter configuration phase (Step 50).

FIG. 5 is a flowchart showing the battery charge parameter configuration phase (Step 50).

BMS 38 transmits a battery charge parameter message BCP of a motive power storage battery to charger controller 73 (Step 31).

Charger controller 73 transmits a charger time synchronization message CTS, a charger max/min output parameter message CML, and a charger charging/discharging requirement message CCD to BMS 38 (Step 32).

Then, BMS 38 determines whether or not there is a problem in carrying out charging (Step 33). When BMS 38 determines that there is no problem in carrying out charging (Yes in Step 33), it transmits a charging readiness message BRO to charger controller 73 (Step 34). When BMS 38 determines that there is a problem in carrying out charging (No in Step 33), BMS 38 transmits an error message (Step 37) and does not carry out charging.

When charger controller 73 receives battery charge parameter message BCP of the motive power storage battery, it determines whether or not there is a problem in carrying out charging (Step 35). When charger controller 73 determines that there is no problem in carrying out charging (Yes in Step 35), it transmits a message of charger output readiness CRO to BMS 38 (Step 36). On the other hand, when charger controller 73 determines that there is a problem in charging (No in Step 35), it transmits an error message (Step 38) and does not start charging.

Battery charge parameter message BCP of the motive power storage battery includes information showing a maximum allowable charging voltage, a highest allowable charging current, and a highest allowable temperature of power storage 10.

Charger time synchronization message CTS includes time synchronization information transmitted from charger controller 73 to BMS 38.

Charger max/min output parameter message CML includes information showing a highest output voltage, a lowest output voltage, a maximum output current, and a minimum output current.

Charger charging/discharging requirement message CCD includes information indicating a charging/discharging direction from charging apparatus 3. For example, "00" indicates charging and "01" indicates discharging.

Charging readiness message BRO (Battery Ready Output) is a message in which BMS 38 indicates to charging apparatus 3 that stand-by for charging is complete. In the stand-by state, BMS 38 sets contactors K5 and K6 to the closed (ON) state (Step 39).

Message of charger output readiness CRO is a message in which charging apparatus 3 indicates to BMS 38, completion of stand-by for charging. After charger controller 73 transmits message of charger output readiness CRO, it sets contactors K1 and K2 to the closed (ON) state (Step 130).

Then, BMS 38 transmits a threshold value request signal RS1 to server 4 (Step 132). Threshold value request signal RS1 is a signal to request server 4 to give charging threshold value TH1 of charging apparatus 3. Threshold value request signal RS1 includes information showing current position information of vehicle 2.

When server 4 receives threshold value request signal RS1 from vehicle 2, it specifies charging apparatus 3 and charging threshold value TH1 of charging apparatus 3 based on current position information of vehicle 2 included in threshold value request signal RS1 and database DB1.

Then, server 4 transmits a response signal RP1 to vehicle 2 (Step 134). Response signal RP1 includes charging threshold value TH1 of specified charging apparatus 3.

The charging phase (Step 60) will now be described.

In FIG. 3, charger controller 73 starts charging by having charger 22 driven. In this charging phase, BMS 38 transmits a charging demand of power storage 10 to charger controller 73. Charging apparatus 3 adjusts a charging voltage and a charging current.

Figure 6:
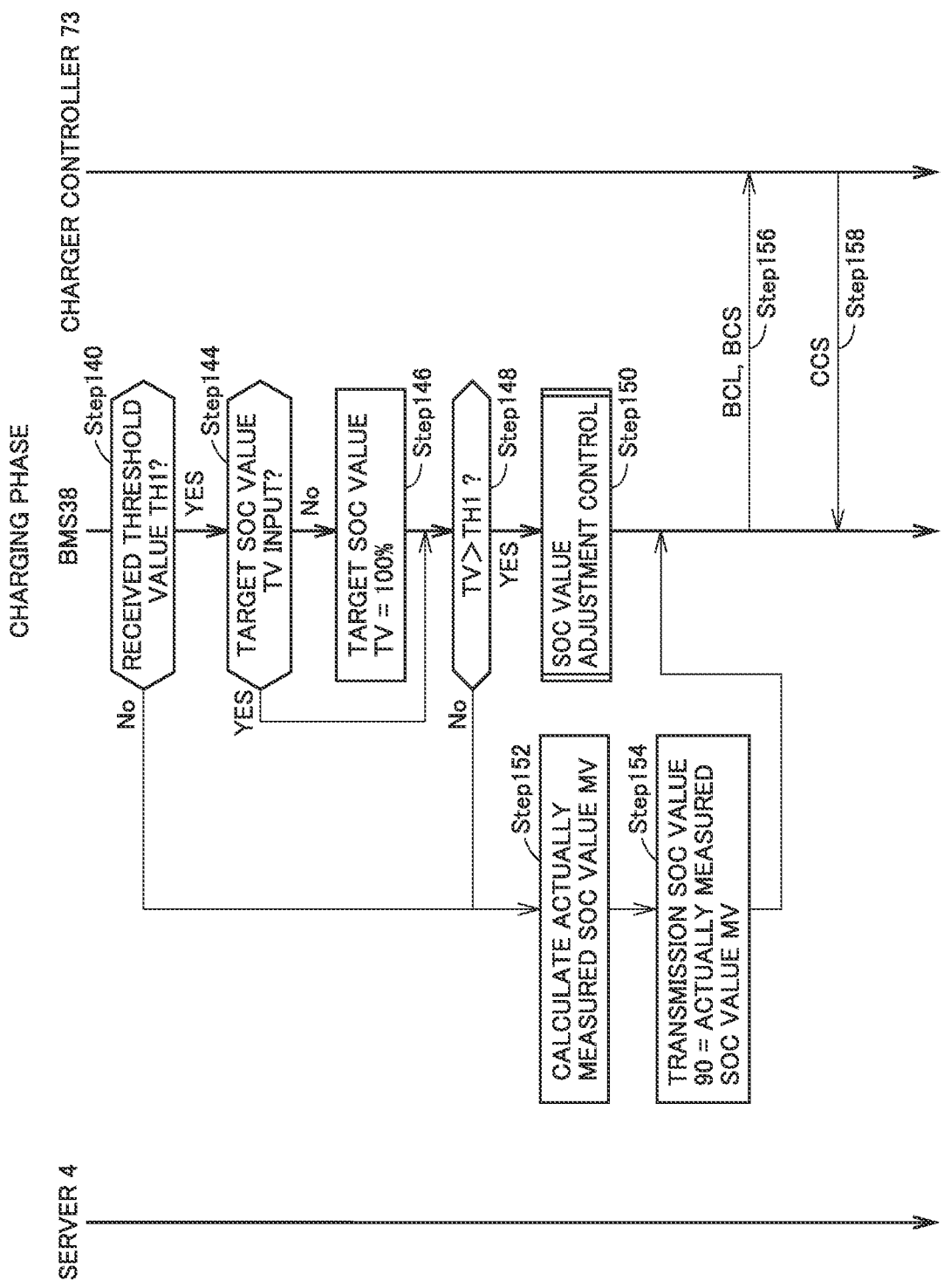
FIG. 6 is a flowchart showing a part of a flow in a charging phase (Step 60).

FIG. 6 is a flowchart showing a part of a flow in the charging phase (Step 60).

When BMS 38 receives message of charger output readiness CRO, it determines whether or not it has received charging threshold value TH1 from server 4 (Step 140).

When BMS 38 determines that it has received charging threshold value TH1 (Yes in Step 140), it determines whether or not it has received input of target SOC value TV (Step 144). When the BMS determines that it has not received input of target SOC value TV (No in Step 144), it sets 100 (%) as target SOC value TV (Step 146).

Then, BMS 38 determines whether or not target SOC value TV is larger than charging threshold value TH1 (Step 148). Then, when target SOC value TV is larger than charging threshold value TH1, the BMS carries out SOC value adjustment control (Step 150). When target SOC value TV is equal or smaller than charging threshold value TH1 (NO in Step 148), the BMS does not carry out SOC value adjustment control.

When the BMS determines that it has not received charging threshold value TH1 (No in Step 140) and when target SOC value TV is equal to or smaller than charging threshold value TH1 (NO in Step 148), BMS 38 calculates an actually measured SOC value (second charging ratio) MV (Step 152). Actually measured SOC value MV is calculated based on an actually measured voltage of power storage 10 or the like and actually measured SOC value MV represents an actual SOC value at that time point. Then, BMS 38 sets actually measured SOC value MV as transmission SOC value 90 (Step 154). Transmission SOC value 90 is a value to be transmitted to charger controller 73 as will be described later.

Figure 7:
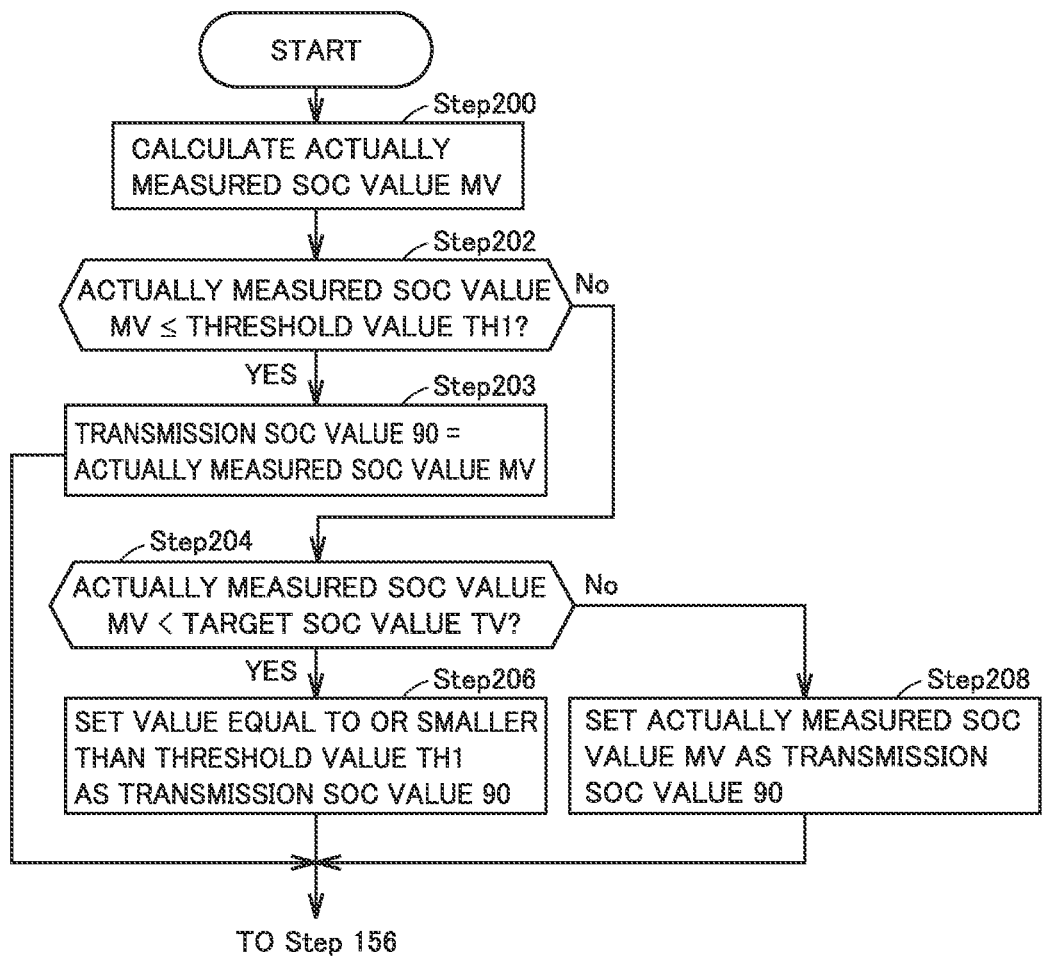
FIG. 7 is a flowchart showing SOC value adjustment control.

FIG. 7 is a flowchart showing SOC value adjustment control. BMS 38 calculates actually measured SOC value MV of power storage 10 (Step 200). Then, BMS 38 determines whether or not actually measured SOC value MV is equal to or smaller than charging threshold value TH1 (Step 202). When BMS 38 determines that actually measured SOC value MV is equal to or smaller than charging threshold value TH1 (Yes in Step 202), it sets actually measured SOC value MV as transmission SOC value 90 (Step 203).

When BMS 38 determines that actually measured SOC value MV is larger than charging threshold value TH1 (No in Step 202), it determines whether or not actually measured SOC value MV is smaller than target SOC value TV (Step 204). When input of target SOC value TV has not been provided, target SOC value TV is set to 100(%). In other words, whether or not power storage 10 has fully been charged is determined.

When BMS 38 determines that actually measured SOC value MV is smaller than target SOC value TV (Yes in Step 204), BMS 38 sets a value equal to or smaller than charging threshold value TH1 as transmission SOC value 90 (Step 206). For example, charging threshold value TH1 is set as transmission SOC value 90.

In the present embodiment, BMS 38 is unable to obtain prescribed value TH set by charging apparatus 3 and estimates charging threshold value TH1 obtained from server 4 as prescribed value TH. Therefore, when actually measured SOC value MV is larger than charging threshold value TH1 and actually measured SOC value MV is smaller than target SOC value TV, it is desired that vehicle 2 continues charging and actually measured SOC value MV attains to target SOC value TV.

On the other hand, when transmission SOC value 90 to be transmitted to charger controller 73 is larger than charging threshold value TH1, charger controller 73 may stop charging.

In the present embodiment, the value of transmission SOC value 90 is not set to actually measured SOC value MV but to a value equal to or smaller than charging threshold value TH1. Thus, even when transmission SOC value 90 is transmitted to charger controller 73, possibility of stop of charging by charger controller 73 can be lowered.

Then, when BMS 38 determines that actually measured SOC value MV is equal to or larger than target SOC value TV (No in Step 204), it sets actually measured SOC value MV as transmission SOC value 90 (Step 208).

In other words, when actually measured SOC value MV attains to target SOC value TV, vehicle 2 should stop charging. In Step 148, target SOC value TV is larger than charging threshold value TH1 and actually measured SOC value MV is larger than target SOC value TV. Therefore, by transmitting actually measured SOC value MV to charger controller 73 as transmission SOC value 90, possibility of stop of charging by charger controller 73 becomes higher.

When input of target SOC value TV has not been provided, in Step 146, target SOC value TV is set to 100(%), and 100 (%) is set as transmission SOC value 90.

Referring back to FIG. 6, BMS 38 transmits a battery charging demand message BCL and a battery charge status message BCS to charger controller 73 (Step 156).

Charger controller 73 transmits a charger charge state message CCS to BMS 38 (Step 158).

Battery charging demand message BCL includes information representing a voltage demand (V), a current demand (A), and a charging mode.

Battery charge status message BCS includes transmission SOC value 90. Furthermore, battery charge status message BCS includes information representing a measurement value of a charging voltage (V), a measurement value of a charging current (A), a voltage of a highest unit cell and a number for identifying the highest unit cell, an estimated remaining charging time period, and a voltage of a lowest unit cell and a number for identifying the lowest unit cell.

The highest unit cell refers to unit cell 16 highest in voltage among a plurality of unit cells 16 provided in power storage 10. The lowest unit cell refers to unit cell 16 lowest in voltage among the plurality of unit cells 16 provided in power storage 10.

Charger charge state message CCS includes information representing a voltage output value (V) and a current output value (A) currently provided from charging apparatus 3 and a cumulative charging time period.

Figure 8:
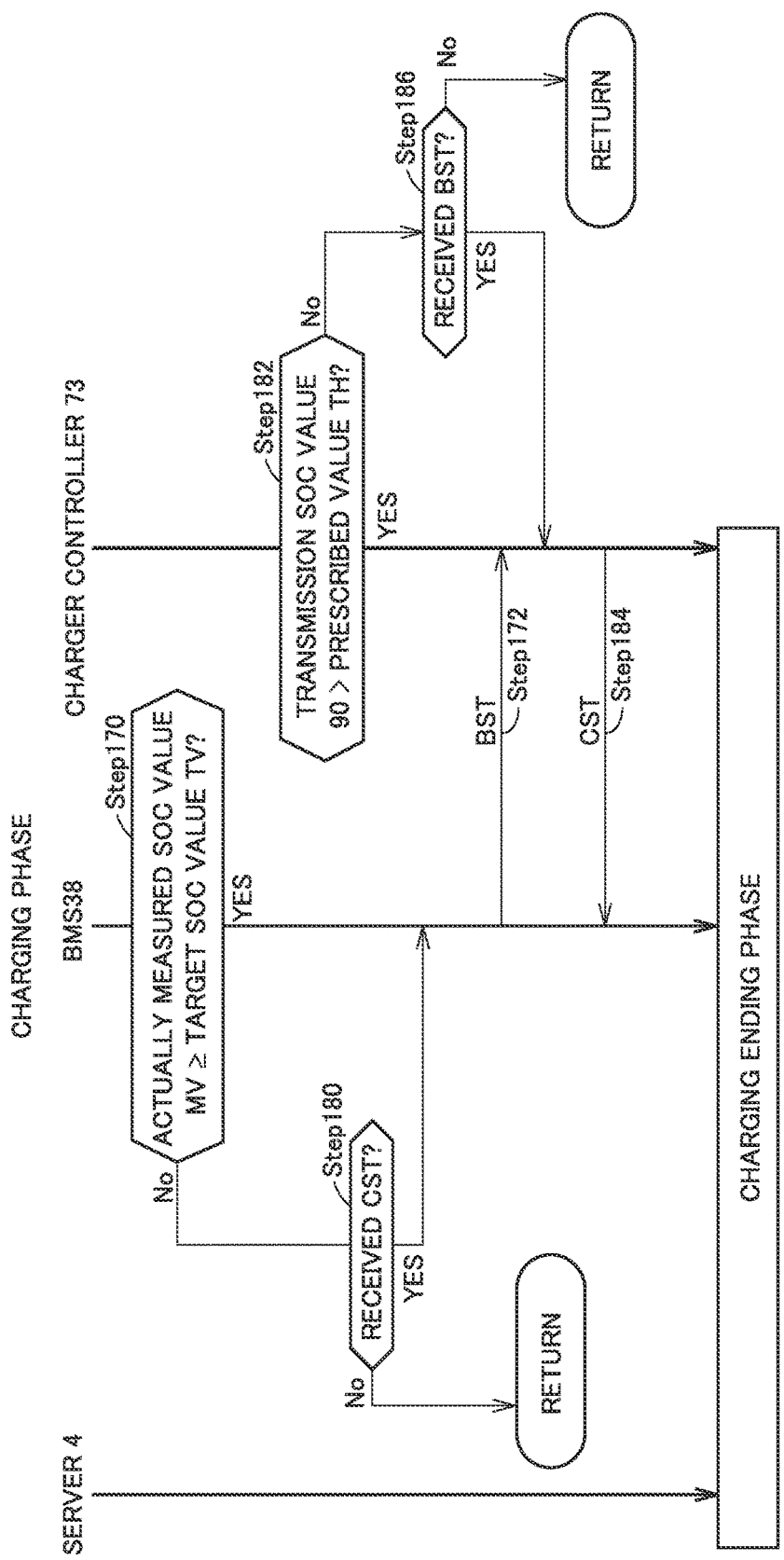
FIG. 8 is a flowchart of the charging phase subsequent to the flowchart shown in FIG. 6.

FIG. 8 is a flowchart of the charging phase subsequent to the flowchart shown in FIG. 6. In FIG. 8, BMS 38 determines whether or not actually measured SOC value MV of power storage 10 is equal to or larger than target SOC value TV (Step 170).

When input of target SOC value TV has not been provided, in Step 146, target SOC value TV is set to 100(%). In this case, when actually measured SOC value MV attains to 100(%) and power storage 10 is fully charged, the condition is satisfied.

When BMS 38 determines that actually measured SOC value MV is equal to or larger than target SOC value TV (Yes in Step 170), BMS 38 transmits a stop charging message BST to charger controller 73 (Step 172) and charging enters the charging ending phase.

On the other hand, when BMS 38 determines that actually measured SOC value MV is smaller than target SOC value TV (No in Step 170), BMS 38 determines whether or not it has received a stop charging message CST of the charger which will be described later (Step 180). When BMS 38 determines that it has received stop charging message CST of the charger (Yes in Step 180), BMS 38 transmits stop charging message BST (Step 172). Then, when BMS 38 determines that it has not received stop charging message CST of the charger (No in Step 180), BMS 38 repeats control in the charging phase.

Charger controller 73 determines whether or not transmission SOC value 90 is larger than prescribed value TH (Step 182). Transmission SOC value 90 is included in battery charge status message BCS in Step 156.

When charger controller 73 determines that transmission SOC value 90 is larger than prescribed value TH (Yes in Step 182), it transmits stop charging message CST of the charger to BMS 38 (Step 184).

When charger controller 73 determines that transmission SOC value 90 is equal to or smaller than prescribed value TH (No in Step 182), charger controller 73 determines whether or not it has received stop charging message BST (Step 186). When charger controller 73 determines that it has received stop charging message BST (Yes in Step 186), it transmits stop charging message CST of the charger (Step 184). On the other hand, when the charger controller determines that it has not received stop charging message BST (No in Step 186), it repeats control in the charging phase.

The charging ending phase (Step 70) will now be described.

In stopping charging, charging apparatus 3 and BMS 38 enter the charging ending phase. In this charging ending phase, BMS 38 transmits information on the SOC or the like at the time of end of charging to charger controller 73. Charger controller 73 transmits an amount of output electric power or the like in the charging process to BMS 38.

Figure 9:
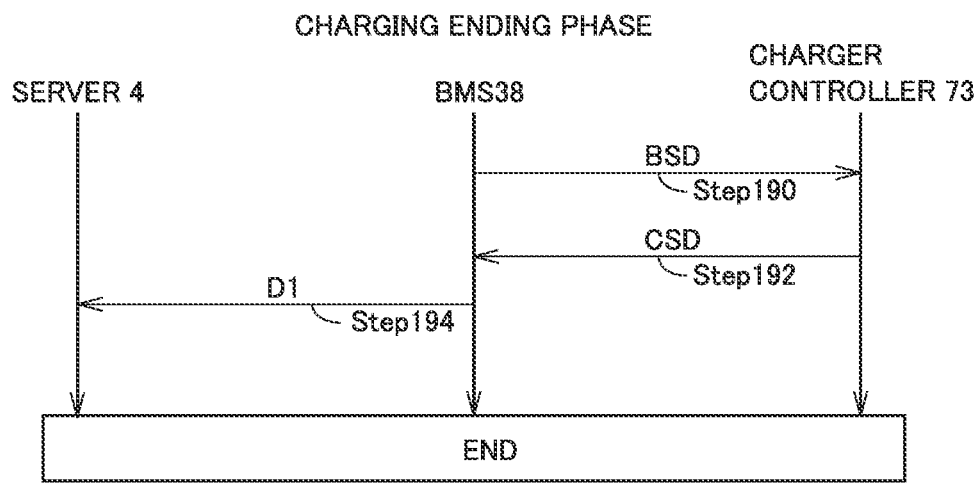
FIG. 9 is a flowchart showing a charging ending phase.

FIG. 9 is a flowchart showing the charging ending phase. BMS 38 transmits a statistical data message BSD to charger controller 73 (Step 190). Charger controller 73 transmits a statistical data message CSD of the charger to BMS 38 (Step 192).

BMS 38 further transmits information D1 (Step 194).

Information D1 includes a completion SOC value 91, information representing whether or not SOC value adjustment control has been carried out, and information representing target SOC value TV. When target SOC value TV has not been set, 100(%) is transmitted as target SOC value TV.

Server 4 updates charging threshold value TH1 based on information D1. For example, an average value of completion SOC values 91 in instances where SOC value adjustment control is not carried out and target SOC value TV is set to 100(%) is set as charging threshold value TH1.

Information D1 is transmitted from a plurality of vehicles to server 4 and various methods can be adopted as a method of calculating charging threshold value TH1 based on a plurality of pieces of information D1.

Second Embodiment

Figure 10:
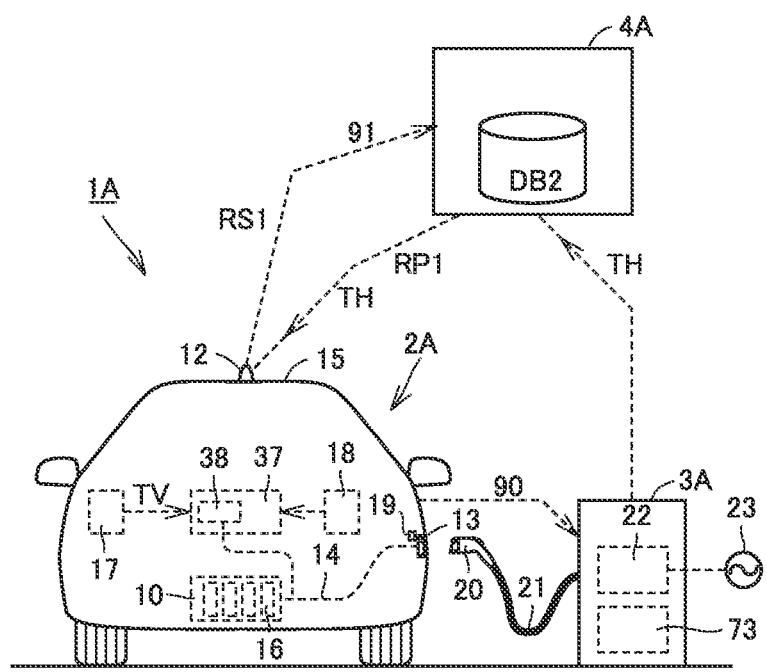
FIG. 10 is a schematic diagram schematically showing a charging system 1A according to the present second embodiment.

A charging system 1A according to the present second embodiment will be described with reference to FIG. 10 and the like. In FIG. 10, a charging apparatus 3A is configured to communicate with a server 4A.

Charging apparatus 3A transmits prescribed value TH to server 4A. Another charging apparatus which is not shown also similarly transmits prescribed value TH to server 4A and server 4A obtains information on prescribed values TH of the plurality of charging apparatuses. Server 4 includes a storage, and a database DB2 is stored in this storage.

Figure 12:
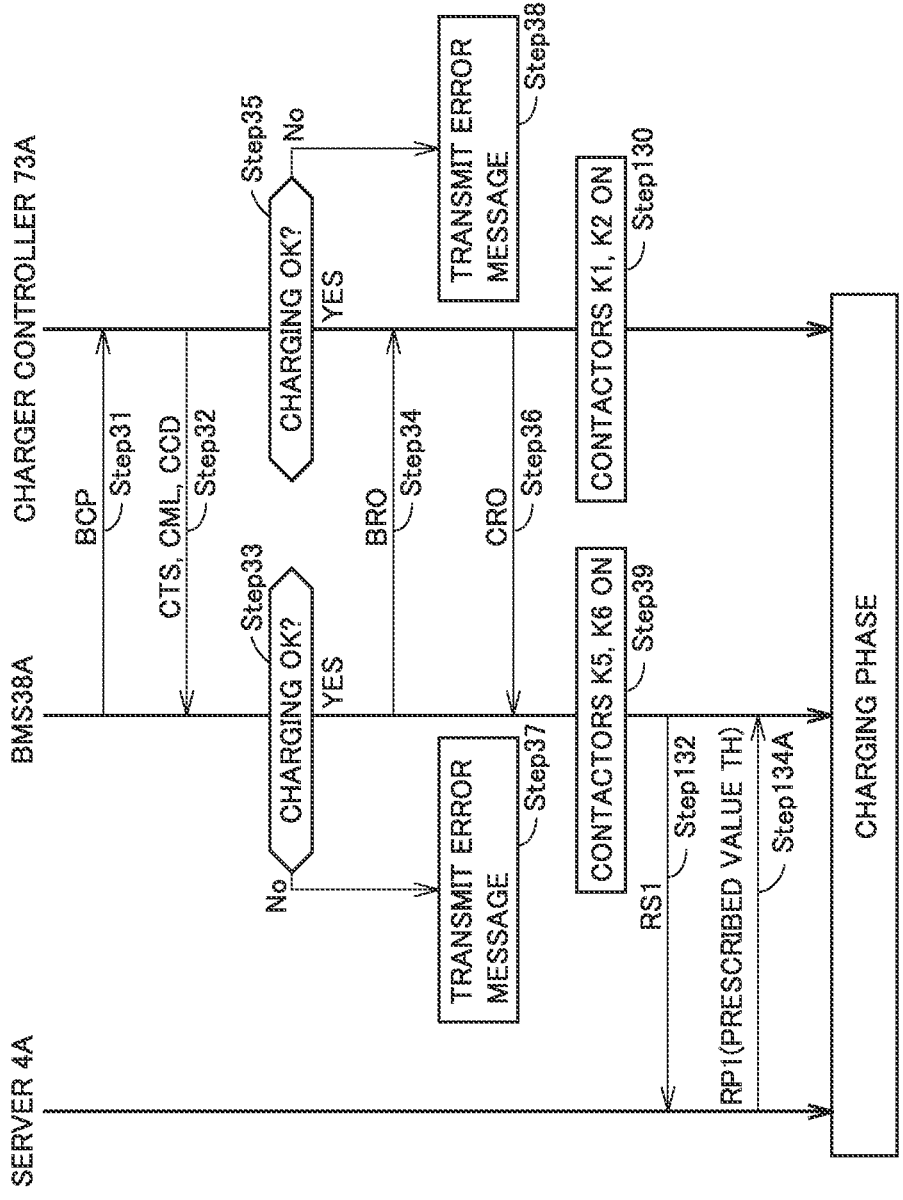
FIG. 12 is a schematic diagram schematically showing a database DB2 in server 4 according to the second embodiment.

FIG. 12 is a schematic diagram schematically showing database DB2 in server 4 according to the second embodiment. Database DB2 includes a charging apparatus ID for identifying each charging apparatus, position information of each charging apparatus, and prescribed value TH of each charging apparatus.

A charging protocol is executed also in charging system 1A according to the second embodiment, as in the charging flow of charging system 1 according to the first embodiment. A difference from the charging flow of charging system 1 will mainly be described.

FIG. 11 is a flowchart showing a flow in the battery charge parameter configuration phase in charging system 1A.

When a BMS 38 of a vehicle 2A transmits threshold value request signal RS1 (Step 132), server 4A transmits response signal RP1 to vehicle 2A (Step 134A). Threshold value request signal RS1 includes position information of vehicle 2A at the time of start of charging. Server 4A specifies charging apparatus 3A based on position information of vehicle 2A included in threshold value request signal RS and database DB2. Then, the server transmits prescribed value TH of charging apparatus 3A to vehicle 2A.

Figure 13:
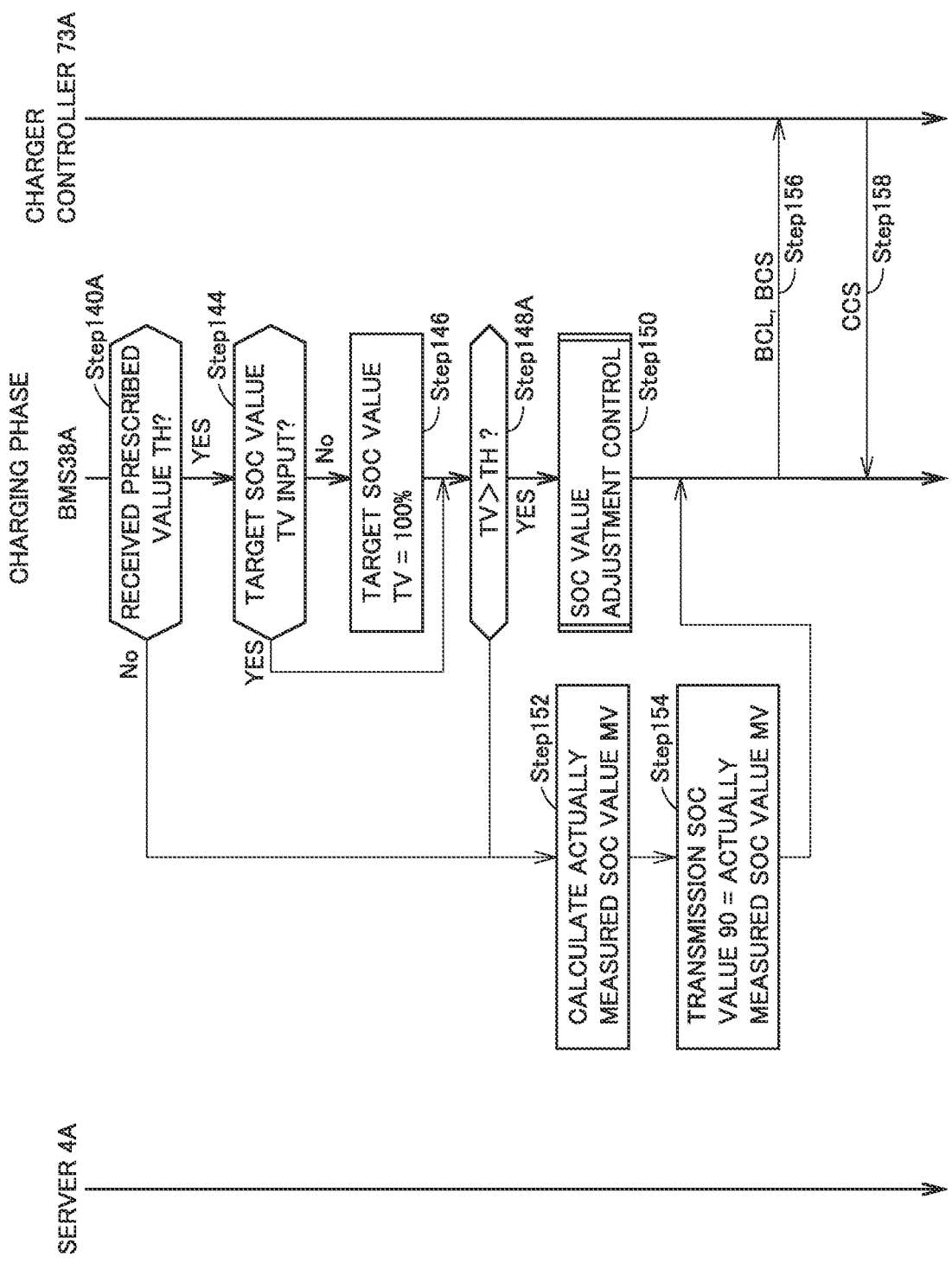
FIG. 13 is a flowchart showing a part of a flow in the charging phase.

FIG. 13 is a flowchart showing a part of a flow in the charging phase. The flow in the charging phase is different in Step 140 and Step 148 from the flow in the charging phase according to the first embodiment.

When BMS 38A receives message of charger output readiness CRO, it determines whether or not it has received prescribed value TH from server 4 (Step 140A).

Then, when BMS 38A determines that it has received prescribed value TH (Yes in Step 140A), BMS 38A determines whether or not it has received input of target SOC value TV (Step 144). When BMS 38A determines that it has not received input of target SOC value TV (No in Step 144), BMS 38A determines whether or not target SOC value TV is larger than prescribed value TH (Step 148A).

Then, when BMS 38A determines that target SOC value TV is larger than prescribed value TH, it carries out SOC value adjustment control (Step 150).

Figure 14:
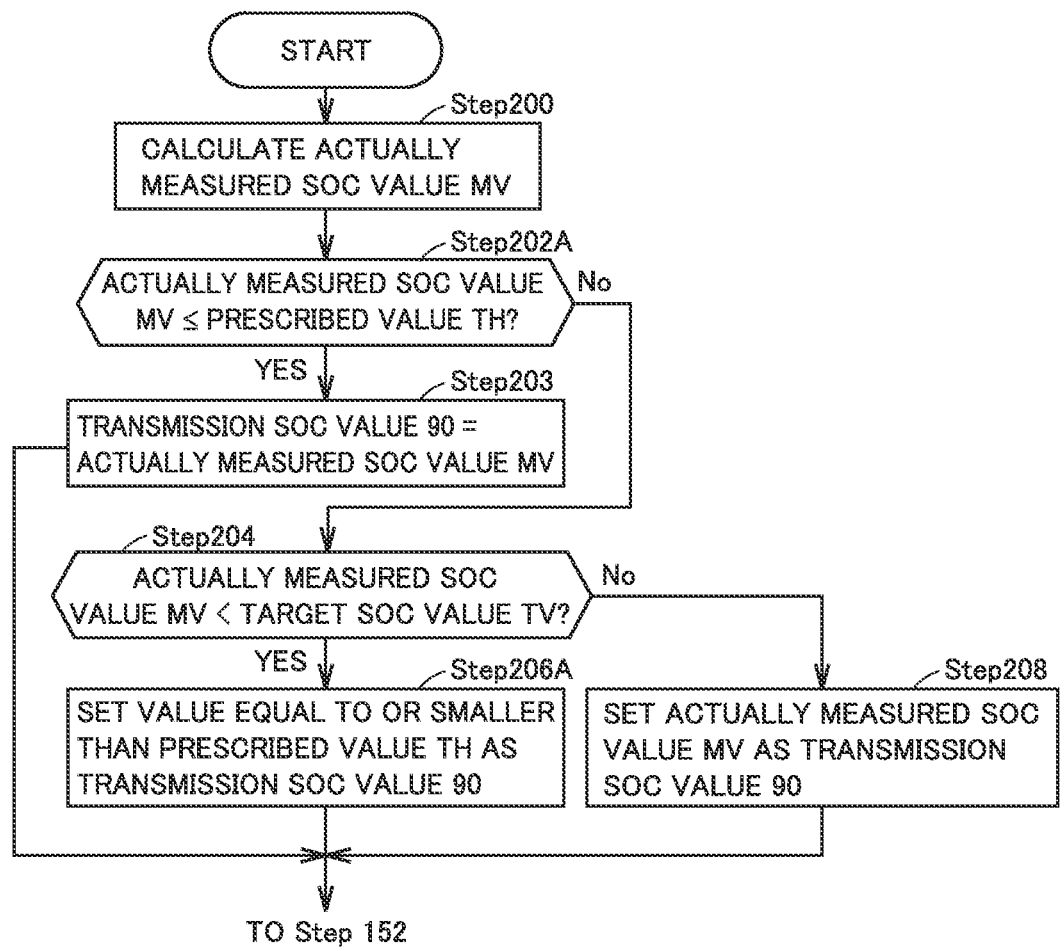
FIG. 14 is a flowchart showing SOC value adjustment control.

FIG. 14 is a flowchart showing SOC value adjustment control. The flow in the second embodiment is different in Step 202 and Step 206 from the flow in the first embodiment.

After BMS 38A calculates actually measured SOC value MV (Step 200), BMS 38A determines whether actually measured SOC value MV is equal to or smaller than prescribed value TH (Step 202A).

Then, when BMS 38A determines that actually measured SOC value MV is equal to or smaller than prescribed value TH (Yes in Step 202A), BMS 38A sets actually measured SOC value MV as transmission SOC value 90 (Step 203).

When BMS 38A determines that actually measured SOC value MV is larger than prescribed value TH (No in Step 202A), BMS 38A determines whether or not actually measured SOC value MV is smaller than target SOC value TV (Step 204).

Then, when BMS 38A determines that actually measured SOC value MV is smaller than target SOC value TV (Yes in Step 204), BMS 38A sets a value equal to or smaller than prescribed value TH as transmission SOC value 90 (Step 206A). When BMS 38A determines that actually measured SOC value MV is equal to or larger than target SOC value TV (No in Step 204), BMS 38A sets actually measured SOC value MV as transmission SOC value 90 (Step 208).

Referring back to FIG. 13, BMS 38A transmits battery charging demand message BCL and battery charge status message BCS to a charger controller 73A (Step 156). Battery charge status message BCS includes transmission SOC value 90. Then, charger controller 73A transmits charger charge state message CCS to BMS 38A (Step 158).

Figure 15:
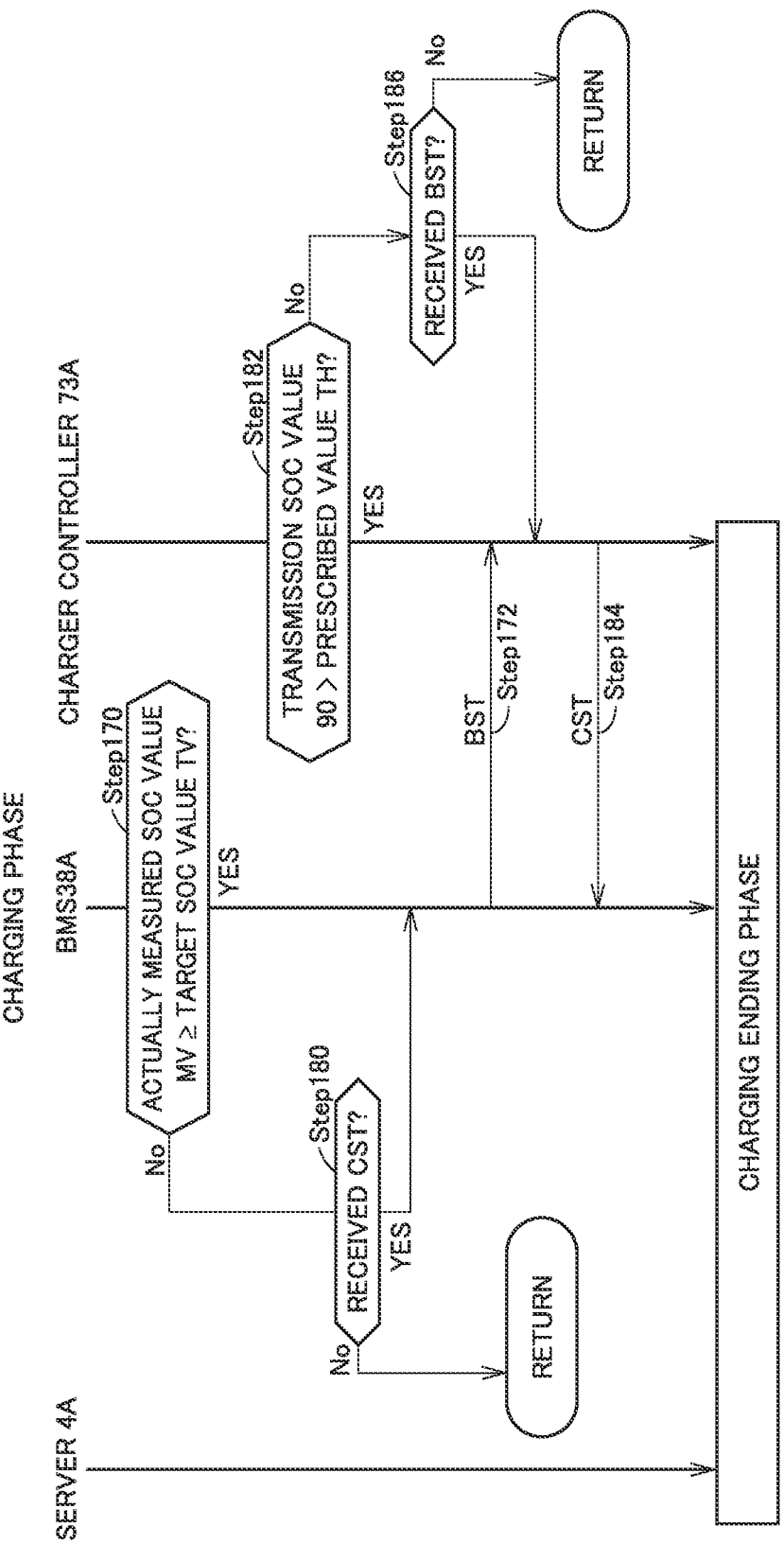
FIG. 15 is a flowchart showing the charging phase subsequent to the flow shown in FIG. 13.

FIG. 15 is a flowchart showing the charging phase subsequent to the flow shown in FIG. 13. The flow in the second embodiment is the same as the flow in the first embodiment.

Then, when charger controller 73A also determines that transmission SOC value 90 is larger than prescribed value TH (Yes in Step 182), charger controller 73A transmits stop charging message CST of the charger to BMS 38A (Step 184). Then, the control flow makes transition to the charging ending phase.

In charging system 1A according to the present second embodiment, charging apparatus 3A transmits prescribed value TH to server 4A. Then, before start of charging, vehicle 2A receives prescribed value TH.

Therefore, in charging system 1A according to the second embodiment, transmission SOC value 90 is set based on prescribed value TH instead of charging threshold value TH1.

Third Embodiment

Figure 16:
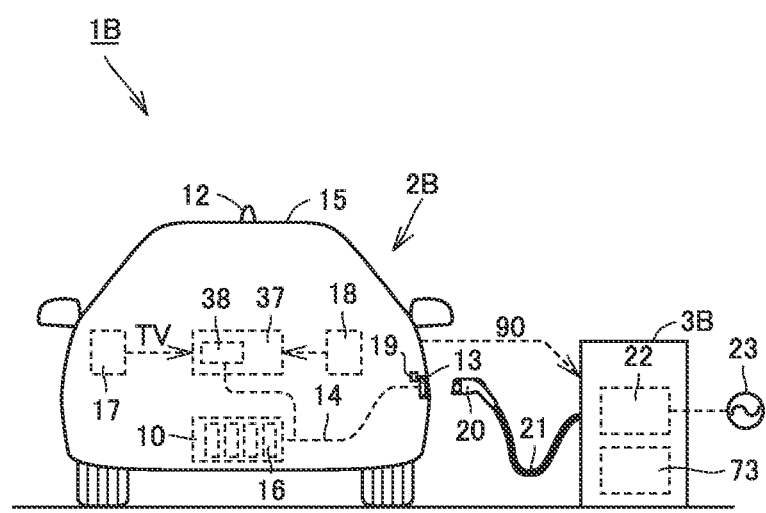
FIG. 16 is a schematic diagram schematically showing a charging system 1B.

A vehicle 2B and a charging system 1B according to a third embodiment will be described with reference to FIG. 16 and the like. FIG. 16 is a schematic diagram schematically showing charging system 1B. Charging system 1B includes vehicle 2B and a charging apparatus 3B but does not include a server.

In charging system 1B, in the charging process, charging system 1B transmits transmission SOC value 90.

Figure 17:
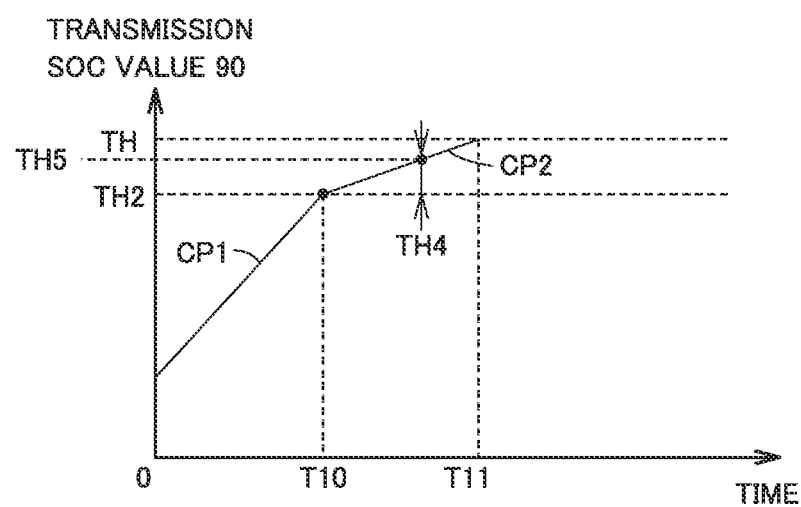
FIG. 17 shows a graph of variation in charging power provided by charging system 1B in a charging process.

FIG. 17 shows a graph of variation in charging power provided by charging system 1B in the charging process.

In this graph, the ordinate represents transmission SOC value 90 and the abscissa represents time. In the example shown in this FIG. 17, transmission SOC value 90 is a value while SOC value adjustment control is not carried out.

When transmission SOC value 90 is equal to or smaller than a prescribed value TH2, charging apparatus 3B provides charging power CP1. Therefore, the SOC of power storage 10 increases as time elapses. Transmission SOC value 90 received from vehicle 2B thus also increases. Thereafter, at time T10, transmission SOC value 90 attains to prescribed value TH2.

Then, when charging apparatus 3B determines that transmission SOC value 90 is larger than prescribed value TH2, charging apparatus 3B provides charging power CP2. Charging power CP2 is lower than charging power CP1.

Therefore, at time T10 and later, a rate of increase in SOC of power storage 10 is lowered. Accordingly, the rate of increase in transmission SOC value 90 is also lowered.

Thereafter, at time T11, transmission SOC value 90 attains to prescribed value TH. When charging apparatus 3B determines that transmission SOC value 90 becomes equal to or larger than prescribed value TH or attains to prescribed value TH, it stops charging. Specifically, charger controller 73 transmits stop charging message CST of the charger.

Thus, by lowering charging power at the time when transmission SOC value 90 becomes larger than prescribed value TH2, charging apparatus 3B suppresses transmission SOC value 90 greatly exceeding prescribed value TH.

As will be described later, charging apparatus 3B transmits charger charge state message CCS to vehicle 2B in the charging phase. Charger charge state message CCS includes a voltage output value (V) and a current output value (A) currently provided from charging apparatus 3B.

Then, vehicle 2B can know variation in charging power provided from charging apparatus 3B based on received charger charge state message CCS.

Vehicle 2B transmits battery charging demand message BCL to charging apparatus 3B, and battery charging demand message BCL includes a voltage demand (V) and a current demand (A). When the voltage demand (V) and the current demand (A) in battery charging demand message BCL are not varied and an amount of lowering in charging power is larger than a prescribed value TH3, vehicle 2B can determine that transmission SOC value 90 has exceeded prescribed value TH2.

Then, a value calculated by adding a margin TH4 to transmission SOC value 90 at the time when transmission SOC value 90 is determined as exceeding prescribed value TH2 is set as a charging threshold value TH5.

Then, when actually measured SOC value MV is smaller than charging threshold value TH5, vehicle 2B sets a value equal to or smaller than charging threshold value TH5 as transmission SOC value 90. When actually measured SOC value MV becomes equal to or larger than target SOC value TV, vehicle 2B sets actually measured SOC value MV as transmission SOC value 90.

Figure 18:
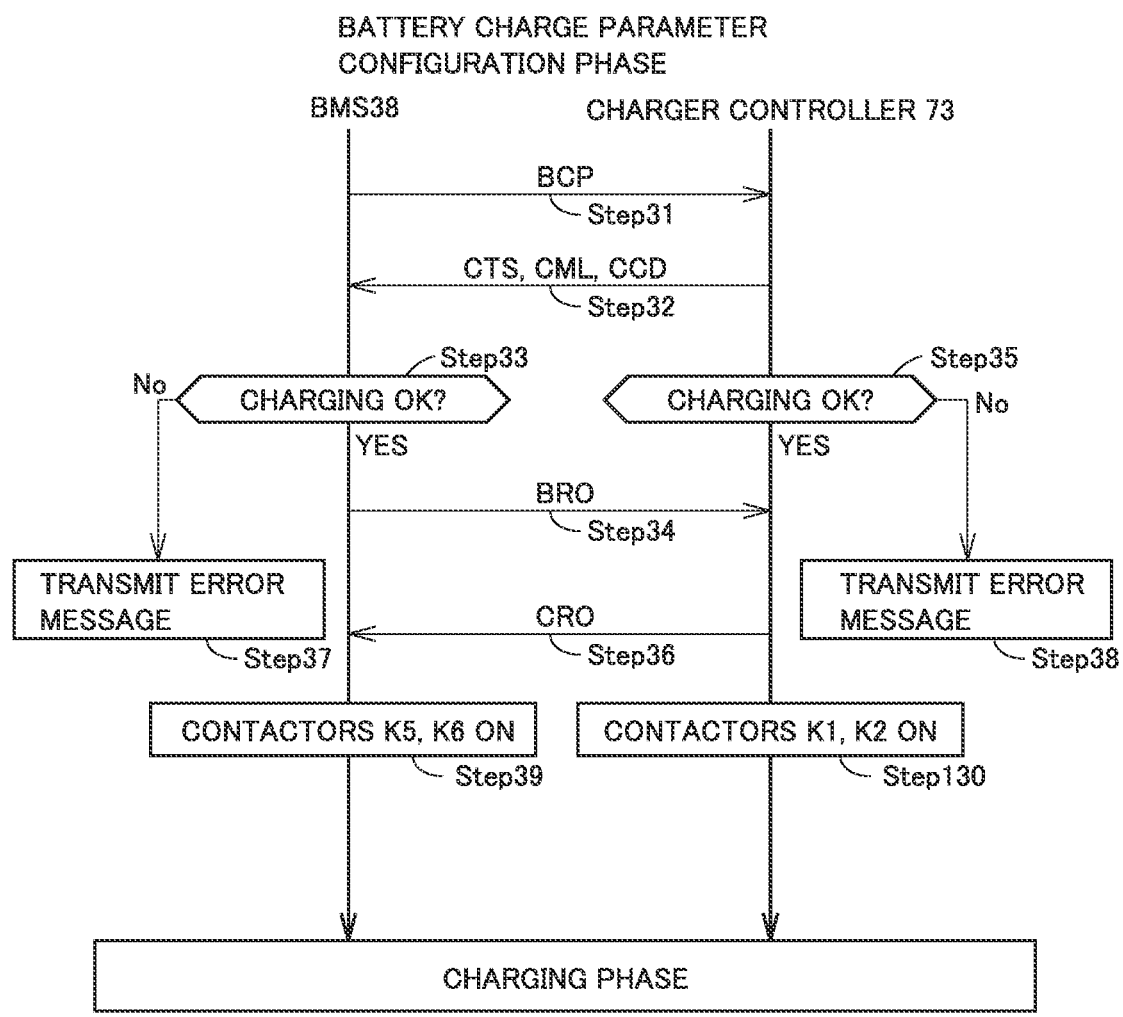
FIG. 18 is a flowchart showing the battery charge parameter configuration phase.

FIG. 18 is a flowchart showing the battery charge parameter configuration phase. In the battery charge parameter configuration phase in the third embodiment, Step 132 and Step 134 shown in FIG. 5 and the like are not performed.

Figure 19:
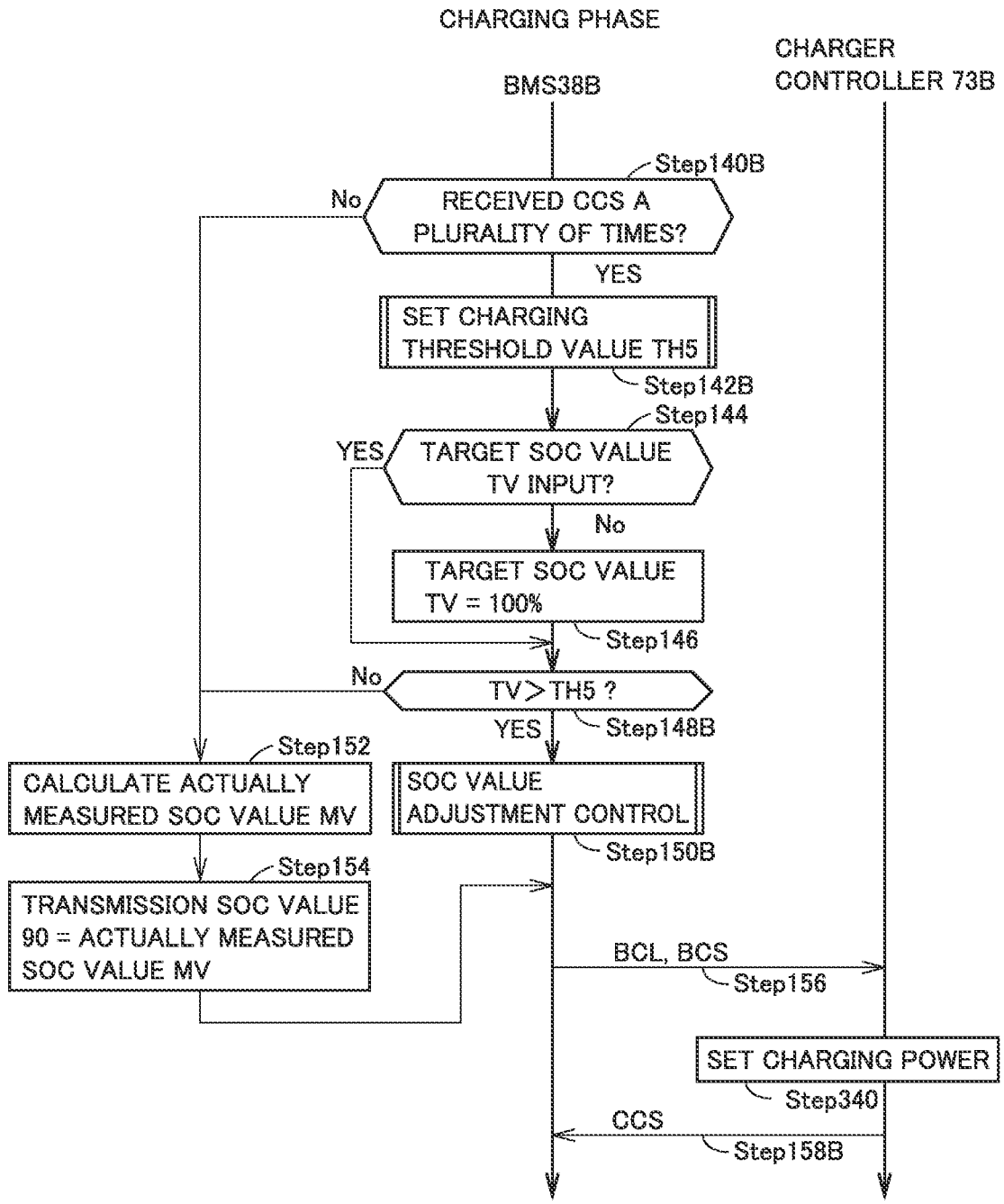
FIG. 19 is a flowchart showing a part of a flow in the charging phase.

FIG. 19 is a flowchart showing a part of a flow in the charging phase. A BMS 38B determines whether or not it has received charger charge state message CCS a plurality of times (Step 140B). Immediately after start of charging, BMS 38B has not received charger charge state message CCS or may have received charger charge state message CCS only once.

In this case (No in Step 140B), BMS 38B calculates actually measured SOC value MV (Step 152) and sets actually measured SOC value MV as transmission SOC value 90 (Step 154).

On the other hand, as a charging time period elapses, BMS 38B receives charger charge state message CCS a plurality of times.

Figure 20:
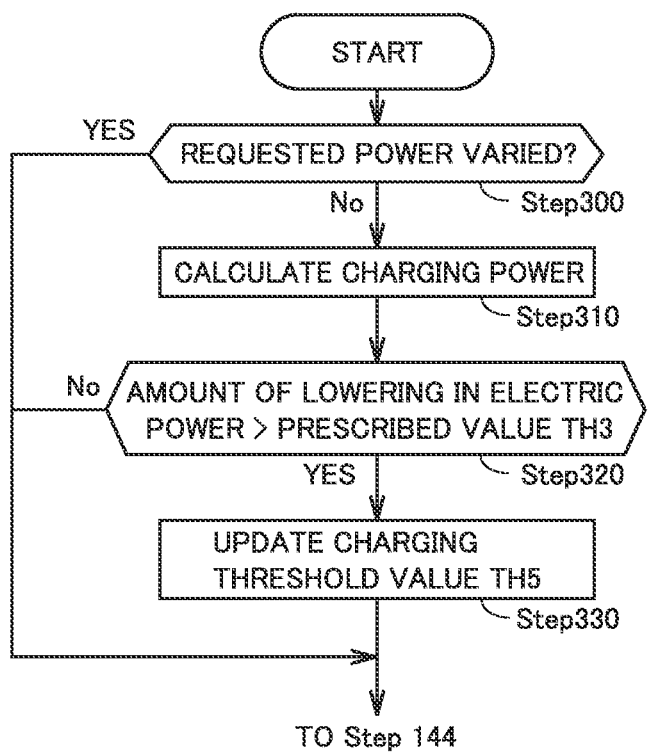
FIG. 20 is a flowchart showing a flow for setting a charging threshold value TH5.

When BMS 38B determines that it has received a plurality of charger charge state messages CCS (Yes in Step 140B), BMS 38B sets charging threshold value TH5 (Step 142B). FIG. 20 is a flowchart showing a flow of setting charging threshold value TH5.

BMS 38B determines whether or not requested power has been varied in battery charging demand message BCL (Step 300). Battery charging demand message BCL includes a voltage demand (V) and a current demand (A), so that requested power can be calculated from the voltage demand and the current demand.

When BMS 38B determines that requested power has not been varied (No in Step 300), BMS 38B calculates charging power (Step 310). BMS 38B periodically receives charger charge state message CCS.

BMS 38B calculates charging power provided from charging apparatus 3B based on most recently received charger charge state message CCS. BMS 38B further calculates charging power provided from charging apparatus 3B based on previously received charger charge state message CCS.

BMS 38B determines whether or not an amount of lowering in charging is larger than prescribed value TH3 (Step 320). The amount of lowering in charging refers to a value calculated by subtracting charging power calculated based on most recent charger charge state message CCS from charging power calculated based on previous charger charge state message CCS.

For example, when charging power has been varied from charging power CP1 to charging power CP2 in FIG. 17, the amount of lowering in electric power is larger than prescribed value TH3.

When BMS 38B determines that the amount of lowering in electric power is larger than prescribed value TH3 (Yes in Step 320), it updates charging threshold value TH5 (Step 330).

Specifically, transmission SOC value 90 included in battery charging demand message BCL most recently transmitted to a charger controller 73B is extracted. Then, a value calculated by adding margin TH4 to this transmission SOC value 90 is adopted as charging threshold value TH5. For example, margin TH4 is set within a range not lower than 15% and not higher than 25%.

The initial value of charging threshold value TH5 is 100(%) and updated to newly calculated charging threshold value TH5 in Step 300.

On the other hand, when BMS 38B determines that requested power has been varied (Yes in Step 300), BMS 38B does not update charging threshold value TH5.

Referring back to FIG. 19, BMS 38B determines whether or not it has received input of target SOC value TV (Step 144). When BMS 38B has not received input of target SOC value TV, BMS 38B sets target SOC value TV to 100(%) (Step 146), and when BMS 38B has received input of target SOC value TV, it sets the input value as target SOC value TV.

Then, BMS 38B determines whether or not target SOC value TV is larger than charging threshold value TH5 (Step 148A). Then, when BMS 38B determines that target SOC value TV is larger than charging threshold value TH5 (Step 148A), it carries out SOC value adjustment control (Step 150A).

Figure 21:
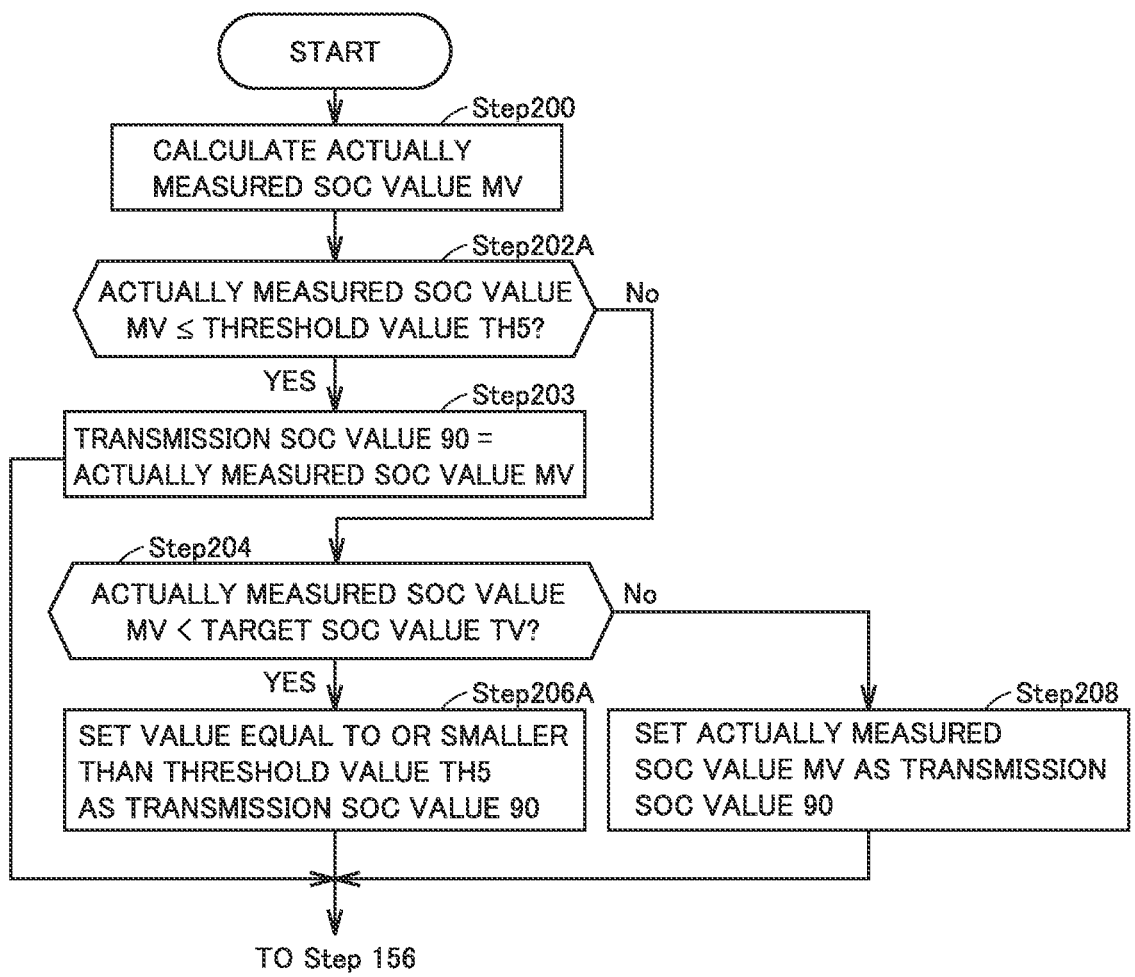
FIG. 21 is a flowchart showing SOC value adjustment control.

FIG. 21 is a flowchart showing SOC value adjustment control. BMS 38B calculates actually measured SOC value MV (Step 200). Then, BMS 38B determines whether or not actually measured SOC value MV is equal to or smaller than charging threshold value TH5 (Step 202A).

Then, when actually measured SOC value MV is determined as being equal to or smaller than charging threshold value TH5 (Yes in Step 202A), actually measured SOC value MV is set as transmission SOC value 90.

When BMS 38B determines that actually measured SOC value MV is larger than charging threshold value TH5, it determines whether or not actually measured SOC value MV is smaller than target SOC value TV (Step 204). When actually measured SOC value MV is smaller than target SOC value TV (Yes in Step 204), BMS 38B sets a value equal to or smaller than charging threshold value TH5 as transmission SOC value 90 (Step 206A). When actually measured SOC value MV is equal to or larger than target SOC value TV, BMS 38B sets actually measured SOC value MV as transmission SOC value 90 (Step 208).

Referring back to FIG. 19, BMS 38B transmits battery charging demand message BCL and battery charge status message BCS (Step 156).

When charger controller 73B receives battery charging demand message BCL, it sets charging power (Step 340). Charger controller 73B sets charging power based on transmission SOC value 90 included in battery charging demand message BCL.

Specifically, as shown in FIG. 17, when transmission SOC value 90 is equal to or smaller than prescribed value TH2, charging power is set to charging power CP1. When transmission SOC value 90 is larger than prescribed value TH2, charging power is set to charging power CP2. Charging power CP2 is lower than charging power CP1.

Then, the voltage output value (V) and the current output value (A) are set to provide set charging power, and charger charge state message CCS is transmitted to 37B (Step 158B).

Figure 22:
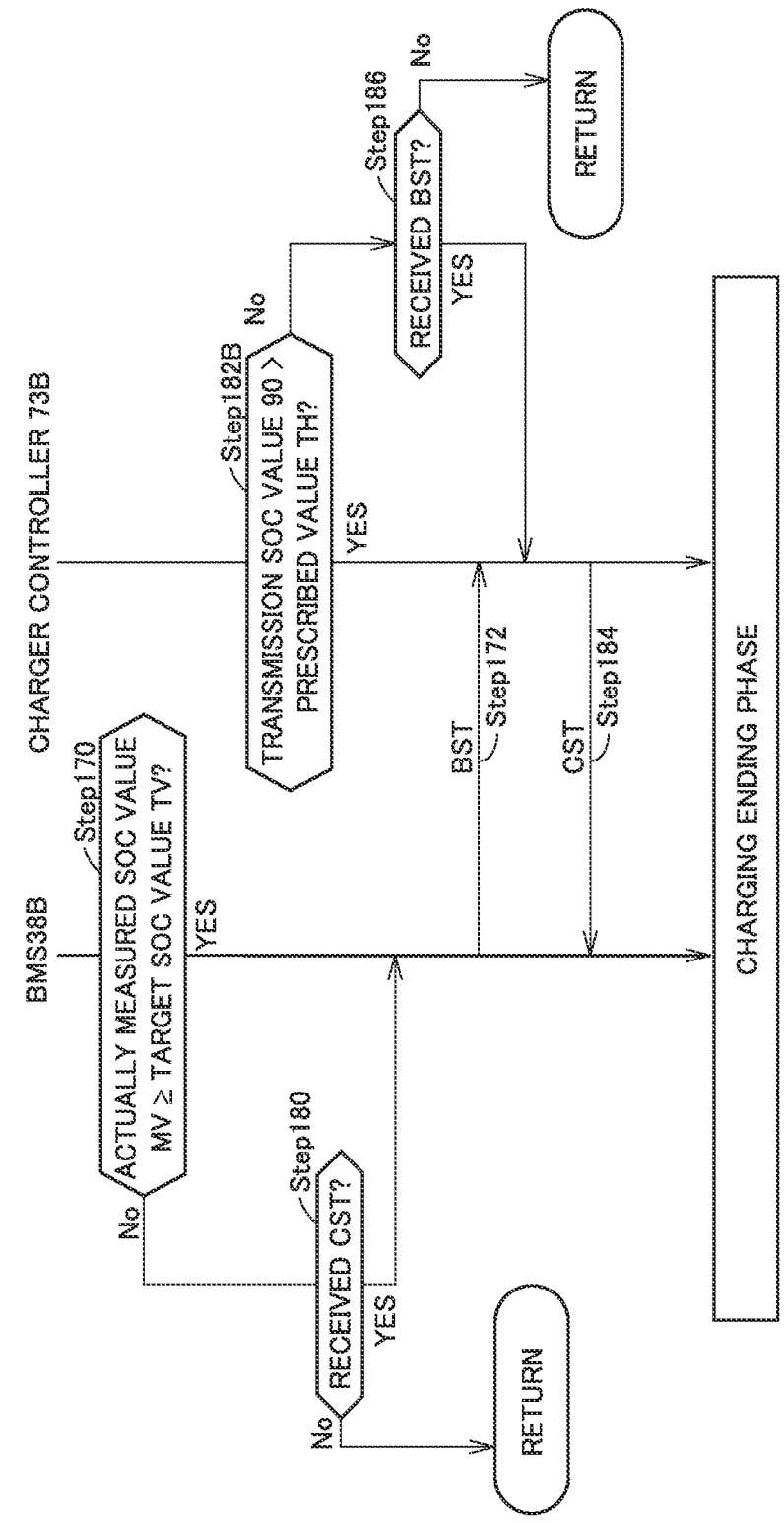
FIG. 22 is a flowchart in the charging phase subsequent to the flow shown in FIG. 19.

FIG. 22 is a flowchart in the charging phase subsequent to the flow shown in FIG. 19.

Then, charger controller 73B determines whether or not transmission SOC value 90 is larger than prescribed value TH (Step 182B).

Then, when transmission SOC value 90 becomes larger than prescribed value TH, charger controller 73B transmits stop charging message CST of the charger (Step 184) and transition to the charging ending phase is made.

In charging system 1B according to this third embodiment, vehicle 2B estimates prescribed value TH based on a condition of charging of charging apparatus 3B.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A vehicle in which a mounted power storage is charged by receiving electric power from an externally provided charging apparatus, the charging apparatus stopping charging to the vehicle when a first charging ratio transmitted from the vehicle becomes higher than a charging device side charging threshold, the vehicle comprising:

the power storage;

a processor that is configured to calculates a second charging ratio representing a charging ratio of the power storage and store a third charging ratio at which the vehicle stops charging; and a communication unit that is configured to transmits the first charging ratio to the charging apparatus and receive information indicating the charging device side charging threshold from the server, wherein, in a charging phase:

when the second charging ratio becomes equal to or higher than the third charging ratio, the processor stops charging, when the third charging ratio is higher than the charging device side charging threshold and the second charging ratio is equal to or lower than the charging device side charging threshold, the processor transmits to the charging apparatus, the second charging ratio as the first charging ratio, when the third charging ratio is higher than the charging device side charging threshold and the second charging ratio is higher than the charging device side charging threshold and lower than the third charging ratio, the processor transmits to the charging apparatus, a value equal to or smaller than the charging device side charging threshold as the first charging ratio, and when the third charging ratio is higher than the charging device side charging threshold and the second charging ratio is equal to or higher than the third charging ratio, the processor transmits to the charging apparatus, the second charging ratio as the first charging ratio.

2. The vehicle according to claim 1, wherein
the third charging ratio is a charging ratio at time when the power storage is in a fully charged state.

3. The vehicle according to claim 1, further comprising an input unit onto which a user enters the third charging ratio, wherein
the third charging ratio is set by using the input unit.

4. The vehicle according to claim 1, wherein
when the third charging ratio is equal to or lower than the charging device side charging threshold, the processor transmits the second charging ratio as the first charging ratio.

5. The vehicle according to claim 1, wherein
the vehicle is configured to communicate with a server,
when charging is completed, the vehicle transmits a charging ratio at time of completion of charging to the server,
the server calculates the charging device side charging threshold based on the charging ratio at the time of completion of charging,
the vehicle transmits a request signal that requests for the charging device side charging threshold, and
when the server receives the request signal, the server transmits the charging device side charging threshold to the vehicle.

6. The vehicle according to claim 1, wherein
the vehicle and the charging apparatus are configured to communicate with a server,
the charging apparatus transmits the charging device side charging threshold to the server,
the vehicle transmits a request signal to the server,
when the server receives the request signal, the server transmits the charging device side charging threshold to the vehicle.

7. The vehicle according to claim 1, wherein
the charging apparatus further includes
a charger connected to an external power supply,
a charge plug,
a first DC (+) wire and a first DC (−) wire that connect the charge plug and the charger to each other,
a first contactor provided in the first DC (+) wire,
a second contactor provided in the first DC (−) wire, and
an insulation monitoring apparatus connected to the first DC (+) wire and the first DC (−) wire,
the vehicle further comprises:
a charge inlet to which the charge plug is connected;
an electronic lock that locks the charge plug connected to the charge inlet;
a second DC (+) wire and a second DC (−) wire that connect the charge inlet and the power storage to each other;
a third contactor provided in the second DC (+) wire; and
a fourth contactor provided in the second DC (−) wire,
after locking of the charge inlet and the charge plug by the electronic lock and before the charging phase, the charging apparatus confirms that the third contactor and the fourth contactor are not stuck while the first contactor and the second contactor are turned OFF,
after the charging apparatus confirms that the third contactor and the fourth contactor are not stuck, the charging apparatus conducts an insulation test with the first contactor and the second contactor being turned ON,
after the charging apparatus completes the insulation test, the charging apparatus transmits a charging readiness message to the vehicle, and
when the vehicle receives the charging readiness message, the vehicle transmits the first charging ratio to the charging apparatus.

8. The vehicle according to claim 1, wherein the processor is further configured to:
determine a charging power variation during the charging phase and updates the charging device side charging threshold based on the determined charging power variation;
set the charging device side charging threshold by adding a margin value to a transmission charging ratio when the charging power variation exceeds a prescribed threshold.

9. The vehicle according to claim 1, wherein the processor is further configured to calculate the charging device side charging threshold based on a charging ratio at time of completion of charging received from a plurality of vehicles charged by the charging apparatus.

10. A charging system comprising:
a power storage vehicle; and
a charging apparatus, wherein
when a first charging ratio transmitted from the vehicle becomes higher than a charging device side charging threshold, the charging apparatus stops charging to the vehicle,
the vehicle includes
a power storage,
a processor that is configured to calculate a second charging ratio representing a charging ratio of the power storage and store a third charging ratio at which the vehicle stops charging, and
a communication unit that is configured to transmit the first charging ratio to the charging apparatus and receive information indicating the charging device side charging threshold from a server,
wherein, in a charging phase:
when the second charging ratio becomes equal to or higher than a third charging ratio, the processor stops charging,
when the third charging ratio is higher than the charging device side charging threshold and the second charging ratio is equal to or lower than the charging device side charging threshold, the processor transmits to the charging apparatus, the second charging ratio as the first charging ratio,
when the third charging ratio is higher than the charging device side charging threshold and the second charging ratio is higher than the charging device side charging threshold and lower than the third charging ratio, the processor transmits to the charging apparatus, a value equal to or smaller than the charging device side charging threshold as the first charging ratio, and
when the third charging ratio is higher than the charging device side charging threshold and the second charging ratio is equal to or higher than the third charging ratio, the processor transmits to the charging apparatus, the second charging ratio as the first charging ratio.

11. The charging system according to claim 10, wherein
the charging apparatus includes
a charger connected to an external power supply,
a charge plug,
a first DC (+) wire and a first DC (−) wire that connect the charge plug and the charger to each other,
a first contactor provided in the first DC (+) wire, a second contactor provided in the first DC (−) wire, and an insulation monitoring apparatus connected to the first DC (+) wire and the first DC (−) wire, the vehicle further includes a charge inlet to which the charge plug is connected, an electronic lock that locks the charge plug connected to the charge inlet, a second DC (+) wire and a second DC (−) wire that connect the charge inlet and the power storage to each other, a third contactor provided in the second DC (+) wire, and a fourth contactor provided in the second DC (−) wire, after locking of the charge inlet and the charge plug by the electronic lock and before the charging phase, the charging apparatus confirms that the third contactor and the fourth contactor are not stuck while the first contactor and the second contactor are turned OFF, after the charging apparatus confirms that the third contactor and the fourth contactor are not stuck, the charging apparatus conducts an insulation test with the first contactor and the second contactor being turned ON, after the charging apparatus completes the insulation test, the charging apparatus transmits a charging readiness message to the vehicle, and when the vehicle receives the charging readiness message, the vehicle transmits the first charging ratio to the charging apparatus.

* * * * *